United States Patent
Albertson et al.

(10) Patent No.: US 8,588,464 B2
(45) Date of Patent: Nov. 19, 2013

(54) ASSISTING A VISION-IMPAIRED USER WITH NAVIGATION BASED ON A 3D CAPTURED IMAGE STREAM

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 1900 days.

(21) Appl. No.: 11/622,696

(22) Filed: Jan. 12, 2007

(65) Prior Publication Data

US 2008/0170118 A1     Jul. 17, 2008

(51) Int. Cl.
*G06K 9/00*     (2006.01)

(52) U.S. Cl.
USPC ........... 382/103; 382/104; 382/107; 340/435; 340/438; 340/436; 340/903; 340/944

(58) Field of Classification Search
USPC .......... 382/103, 104, 107; 340/438, 435, 436, 340/944, 903, 961
See application file for complete search history.

(56) References Cited

U.S. PATENT DOCUMENTS

| | | | |
|---|---|---|---|
| 4,737,847 A | 4/1988 | Araki et al. | |
| 5,019,780 A | 5/1991 | Bailey | |
| 5,103,305 A | 4/1992 | Watanabe | |
| 5,109,425 A | 4/1992 | Lawton | |
| 5,283,644 A | 2/1994 | Maeno | |
| 5,406,491 A * | 4/1995 | Lima | 701/412 |
| 5,454,043 A | 9/1995 | Freeman | |
| 5,502,803 A | 3/1996 | Yoshida et al. | |
| 5,581,276 A | 12/1996 | Cipolla et al. | |
| 5,666,157 A | 9/1997 | Aviv | |
| 5,691,693 A | 11/1997 | Kithil | |
| 5,714,698 A | 2/1998 | Tokioka et al. | |
| 5,747,719 A | 5/1998 | Bottesch | |

(Continued)

FOREIGN PATENT DOCUMENTS

| | | |
|---|---|---|
| CN | 1655197 A | 8/2005 |
| EP | 0905644A A | 3/1999 |

(Continued)

OTHER PUBLICATIONS

Notice of Allowance, U.S. Appl. No. 11/622,679, filed Jan. 12, 2007, Jacob C. Albertson, mailing date May 10, 2012, 20 pages.

(Continued)

*Primary Examiner* — Matthew Bella
*Assistant Examiner* — Julian Brooks
(74) *Attorney, Agent, or Firm* — David A. Mims, Jr.; Amy J. Pattillo

(57) ABSTRACT

An object-enabled navigation system assists a vision-impaired user in navigating an environment. The system captures 3D movement of a moving object within the environment, wherein the three-dimensional movement is determined using at least one image capture device aimed at the moving object. The system predicts a mobile path of the visually-impaired user. The system determines whether the movement of the moving object will intersect with the mobile path of the vision-impaired user and informs the vision-impaired user whether the movement of the moving object will intersect the mobile path of the vision-impaired user.

12 Claims, 7 Drawing Sheets

(56) References Cited

U.S. PATENT DOCUMENTS

| | | | |
|---|---|---|---|
| 5,774,591 A | 6/1998 | Black et al. | |
| 5,777,720 A | 7/1998 | Shapiro et al. | |
| 5,880,731 A | 3/1999 | Liles et al. | |
| 5,907,293 A * | 5/1999 | Tognazzini | 340/903 |
| 5,930,378 A | 7/1999 | Kubota et al. | |
| 6,002,808 A | 12/1999 | Freeman | |
| 6,028,626 A | 2/2000 | Aviv | |
| 6,035,053 A * | 3/2000 | Yoshioka et al. | 382/104 |
| 6,049,747 A | 4/2000 | Nakajima et al. | |
| 6,072,494 A | 6/2000 | Nguyen | |
| 6,080,938 A | 6/2000 | Lutz | |
| 6,115,053 A | 9/2000 | Perlin | |
| 6,154,558 A | 11/2000 | Hsieh | |
| 6,167,381 A | 12/2000 | Swaine et al. | |
| 6,181,343 B1 | 1/2001 | Lyons | |
| 6,189,790 B1 | 2/2001 | Walter | |
| 6,212,510 B1 | 4/2001 | Brand | |
| 6,215,890 B1 | 4/2001 | Matsuo et al. | |
| 6,256,046 B1 | 7/2001 | Waters et al. | |
| 6,295,367 B1 | 9/2001 | Crabtree et al. | |
| 6,301,370 B1 | 10/2001 | Steffens et al. | |
| 6,421,453 B1 | 7/2002 | Kanevsky | |
| 6,526,161 B1 | 2/2003 | Yan | |
| 6,540,674 B2 | 4/2003 | Zadrozny et al. | |
| 6,577,937 B1 | 6/2003 | Shuman | |
| 6,584,375 B2 | 6/2003 | Bancroft et al. | |
| 6,674,877 B1 | 1/2004 | Jojic et al. | |
| 6,766,036 B1 | 7/2004 | Pryor | |
| 6,784,901 B1 | 8/2004 | Harvey et al. | |
| 6,788,809 B1 | 9/2004 | Grzeszczuk et al. | |
| 6,804,396 B2 | 10/2004 | Higaki et al. | |
| 6,859,144 B2 | 2/2005 | Newman et al. | |
| 6,975,246 B1 * | 12/2005 | Trudeau | 340/903 |
| 7,036,094 B1 | 4/2006 | Cohen et al. | |
| 7,039,676 B1 | 5/2006 | Day et al. | |
| 7,058,204 B2 | 6/2006 | MacDougall et al. | |
| 7,068,843 B2 | 6/2006 | Chang et al. | |
| 7,100,818 B2 | 9/2006 | Swaine | |
| 7,110,569 B2 | 9/2006 | Brodsky et al. | |
| 7,126,496 B2 | 10/2006 | Greene | |
| 7,171,024 B2 | 1/2007 | Crabtree | |
| 7,224,830 B2 | 5/2007 | Nefian et al. | |
| 7,239,239 B2 | 7/2007 | Dobler et al. | |
| 7,274,800 B2 | 9/2007 | Nefian et al. | |
| 7,284,201 B2 | 10/2007 | Cohen-Solal | |
| 7,340,077 B2 | 3/2008 | Gokturk et al. | |
| 7,409,373 B2 | 8/2008 | Knagenhjelm | |
| 7,433,493 B1 | 10/2008 | Miyoshi et al. | |
| 7,463,157 B2 | 12/2008 | Victor et al. | |
| 7,602,945 B2 * | 10/2009 | Kubo et al. | 382/104 |
| 7,636,456 B2 | 12/2009 | Collins et al. | |
| 7,653,213 B2 | 1/2010 | Longhurst et al. | |
| 7,720,610 B2 | 5/2010 | Bergfalk et al. | |
| 7,725,547 B2 * | 5/2010 | Albertson et al. | 709/206 |
| 7,792,328 B2 | 9/2010 | Albertson et al. | |
| 7,821,531 B2 | 10/2010 | Yoda et al. | |
| 7,840,031 B2 * | 11/2010 | Albertson et al. | 382/103 |
| 7,970,176 B2 | 6/2011 | Kutliroff et al. | |
| 7,971,156 B2 | 6/2011 | Albertson et al. | |
| 7,996,793 B2 | 8/2011 | Latta et al. | |
| 8,005,675 B2 | 8/2011 | Wasserblat et al. | |
| 8,009,193 B2 | 8/2011 | Zhou et al. | |
| RE42,690 E | 9/2011 | Aviv | |
| 8,013,729 B2 | 9/2011 | Buehler | |
| 2002/0004629 A1 | 1/2002 | Natori | |
| 2002/0107741 A1 | 8/2002 | Stern et al. | |
| 2002/0118880 A1 | 8/2002 | Liu | |
| 2002/0152010 A1 | 10/2002 | Colmenarez | |
| 2002/0178440 A1 | 11/2002 | Agnihotri et al. | |
| 2003/0026461 A1 * | 2/2003 | Arthur Hunter | 382/114 |
| 2003/0058111 A1 | 3/2003 | Lee et al. | |
| 2003/0076300 A1 | 4/2003 | Lauper | |
| 2003/0081834 A1 | 5/2003 | Philomin et al. | |
| 2003/0113018 A1 | 6/2003 | Nefian | |
| 2003/0126013 A1 | 7/2003 | Shand | |
| 2003/0142068 A1 | 7/2003 | DeLuca | |
| 2003/0153817 A1 | 8/2003 | Knagenhjelm | |
| 2003/0156756 A1 | 8/2003 | Goktuk | |
| 2003/0227453 A1 | 12/2003 | Beier et al. | |
| 2003/0234347 A1 | 12/2003 | Akagi | |
| 2004/0001616 A1 | 1/2004 | Gutta et al. | |
| 2004/0032970 A1 | 2/2004 | Kiraly | |
| 2004/0098298 A1 | 5/2004 | Yin | |
| 2004/0161132 A1 | 8/2004 | Cohen et al. | |
| 2004/0193313 A1 | 9/2004 | Cornet et al. | |
| 2004/0228503 A1 | 11/2004 | Cutler | |
| 2005/0030184 A1 | 2/2005 | Victor | |
| 2005/0069852 A1 | 3/2005 | Janakiraman et al. | |
| 2005/0083184 A1 * | 4/2005 | Bos et al. | 340/435 |
| 2005/0157908 A1 | 7/2005 | Matsugu et al. | |
| 2005/0166163 A1 | 7/2005 | Chang | |
| 2005/0206610 A1 | 9/2005 | Cordelli | |
| 2005/0210419 A1 | 9/2005 | Kela et al. | |
| 2006/0013440 A1 | 1/2006 | Cohen | |
| 2006/0040679 A1 | 2/2006 | Shikano et al. | |
| 2006/0045310 A1 | 3/2006 | Tu et al. | |
| 2006/0067573 A1 | 3/2006 | Parr et al. | |
| 2006/0071817 A1 | 4/2006 | Greene | |
| 2006/0097857 A1 * | 5/2006 | Osaka et al. | 340/435 |
| 2006/0098089 A1 * | 5/2006 | Sofer | 348/62 |
| 2006/0098737 A1 | 5/2006 | Sethuraman et al. | |
| 2006/0181518 A1 | 8/2006 | Shen et al. | |
| 2006/0181519 A1 | 8/2006 | Vernier et al. | |
| 2006/0182346 A1 * | 8/2006 | Yoda et al. | 382/190 |
| 2006/0210112 A1 | 9/2006 | Cohen et al. | |
| 2007/0041058 A1 | 2/2007 | Disatnik et al. | |
| 2007/0063855 A1 | 3/2007 | Maass | |
| 2007/0067203 A1 | 3/2007 | Gil et al. | |
| 2007/0097234 A1 | 5/2007 | Katayama | |
| 2008/0004950 A1 | 1/2008 | Huang et al. | |
| 2008/0022365 A1 | 1/2008 | Chae et al. | |
| 2008/0040692 A1 | 2/2008 | Sunday et al. | |
| 2008/0065468 A1 | 3/2008 | Berg et al. | |
| 2008/0068187 A1 | 3/2008 | Bonefas et al. | |
| 2008/0084345 A1 | 4/2008 | Rougas et al. | |
| 2008/0143895 A1 | 6/2008 | Peterka et al. | |
| 2008/0169914 A1 | 7/2008 | Albertson et al. | |
| 2009/0274339 A9 * | 11/2009 | Cohen et al. | 382/103 |
| 2010/0045797 A1 | 2/2010 | Schofield et al. | |
| 2010/0169792 A1 | 7/2010 | Ascar et al. | |
| 2010/0312446 A1 | 12/2010 | Schofield et al. | |
| 2011/0173146 A1 | 7/2011 | Hnatio | |
| 2011/0212770 A1 | 9/2011 | Ocko et al. | |
| 2012/0271785 A1 | 10/2012 | Albertson et al. | |

FOREIGN PATENT DOCUMENTS

| | | | |
|---|---|---|---|
| EP | 0991011 A | 4/2000 | |
| EP | 1723901 A | 11/2006 | |
| EP | 1723901 A1 | 11/2006 | |
| FR | 2784887 A | 4/2000 | |
| JP | 4165498 A | 6/1992 | |
| JP | 2004-328622 A | 11/2004 | |
| JP | 2005-315802 A | 11/2005 | |
| JP | 2005309965 A | 11/2005 | |
| JP | 2006-127240 A | 5/2006 | |
| JP | 2006-165729 A | 6/2006 | |
| JP | 2008-083933 A | 4/2008 | |
| TW | 484105 B | 4/2002 | |
| TW | 200523728 | 7/2005 | |
| WO | 0002187 A | 1/2000 | |
| WO | 2004108466 A | 12/2004 | |
| WO | 2005027023 A1 | 3/2005 | |

OTHER PUBLICATIONS

USPTO Office Action, Dated Mar. 22, 2010, in Re Albertson (U.S. Appl. No. 11/622,690, filed Jan. 12, 2007), 30 pages.
USPTO Office Action, Dated Mar. 30, 2010, in Re Albertson (U.S. Appl. No. 11/622,685, fiiled Jan. 12, 2007), 28 pages.
Doherty, G.J., "Formal Verification in the Design of Gestural Interaction", Electronic Notes in Theoretical Computer Science, vol. 43, pp. 75-96 (2001).

(56) References Cited

OTHER PUBLICATIONS

PCT Report, PCT/EP2008/050170, mailing date May 8, 2008, 13 pages.
PCT Report, PCT/EP2008/050079, mailing date Jul. 4, 2008, 11 pages.
PCT Report, PCT/EP2008/050117, mailing date Jun. 19, 2008, 10 pages.
U.S. Appl. No. 13/370,004, filed Feb. 9, 2012, Albertson et al, International Business Machines Corporation, 64 pages.
USPTO Notice of Allowance, Dated Apr. 23, 2010, in Re Albertson (U.S. Appl. No. 11/622,693, filed Jan. 12, 2007), pp. 1-14.
USPTO Notice of Allowance, Dated May 3, 2010, in Re Albertson (U.S. Appl. No. 11/622,684, filed Jan. 12, 2007), pp. 1-37.
"Method for Access Control Via Gesural Verification", IBM Technical Disclosure Bulletin, IBM Corp, New York, US, vol. 36, No. 9B, Sep. 1, 1993, pp. 487-488, 2 pages.
Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.
Jacob C Albertson et al, "Warning a User About Adverse Behaviors of Others Within an Environment Based on a 3D Captured Image Stream", U.S. Appl. No. 11/622,676, filed Jan. 12, 2007.
Jacob C Albertson et al, "Adjusting a Consumer Experience Based on a 3D Captured Image Stream of a Consumer Response", U.S. Appl. No. 11/622,679, filed Jan. 12, 2007.
Jacob C Albertson et al, "Warning a Vehicle Operator of Unsafe Operation Behavior Based on a 3D Captured Image Stream", U.S. Appl. No. 11/622,684, filed Jan. 12, 2007.
Jacob C Albertson et al, "Tracking a Range of Body Movement Based on 3D Captured Image Streams of a User", U.S. Appl. No.. 11/622,685, filed Jan. 12, 2007.
Jacob C Albertson et al, "Controlling Resource Access Based on User Gesturing in a 3D Captured Image Stream of the User", U.S. Appl. No. 11/622,687, filed Jan. 12, 2007.
Jacob C Albertson et al, "Controlling a Document Based on User Behavioral Signals Detected from a 3D Captured Image Stream", U.S. Appl. No. 11/622,690, filed Jan. 12, 2007.
Jacob C Alberson et al, "Controlling a System Based on User Behavioral Signals Detected from 3D Captured Image Stream", U.S. Appl. No. 11/622,693, filed Jan. 12, 2007.
Jacob C Albertson et al, "Informing a User of Gestures Made by Others Out of the User's Line of Sight", U.S. Appl. No. 11/470,421, filed Sep. 6, 2006.
U.S. Appl. No. 11/622,679, Albertson et al, filed Jan. 12, 2007, Non-Final Office Action, mailing date Jun. 13, 2011, 53 pages.
Notice of Allowance, U.S. Appl. No. 11/622,676, filed Jan. 12, 2007, Albertson et al, mailing date Dec. 30, 2011, 74 pages.
U.S. Appl. No. 11/622,687, Albertson et al, filing Jan. 12, 2007, Notice of Allowance, mailing date Feb. 23, 2011, 14 pages.
U.S. Appl. No. 11/622,676, Albertson et al, filed Jan. 12, 2007, Non-Final Office Action, mailing date Jun. 17, 2011, 63 pages.
PCT Search Report, PCT/EP2008/050170, mailing date May 8, 2008, 13 pages.
Albertson et al, Notice of Allowance, U.S. Appl. No. 11/622,685, filed Jan. 12, 2007, dated Jul. 2, 2010, 13 pages.
Albertson et al, Office Action, U.S. Appl. No. 11/622,687, filed Jan. 12, 2007, dated Aug. 16, 2010, 32 pages.
USPTO Office Action, Dated Jun. 25, 2009, in Re Albertson (U.S. Appl. No. 11/470,421, filed Sep. 6, 2006), pp. 1-20.
Albertson et al, USPTO Notice of Allowance, U.S. Appl. No. 11/622,690, filed Jan. 12, 2007, maining date Sep. 20, 2010, 27 pages.
Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.
"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.
[online], [print accessed on Aug. 18, 2006]. Retrieved from the Internet <http://www.sandia.gov/RADAR/whatis.html>.
"Accelerometer", copyright Wikipedia, 3 pages, [online], [print accessed on Oct. 31, 2006], [last modified on Oct. 24, 2006]. Retrieved from the internet <http://en.wikipedia.org/wiki/Accelerometer>.
Eric Lipton, "Faces, Too are Searched as U.S. Airports Try to Spot Terrorists", 1 page, The New York Times, Aug. 17, 2006.
USPTO Notice of Allowance, Dated Dec. 14, 2009, in Re Albertson (U.S. Appl. No. 11/470,421, filed Sep. 6, 2006), pp. 1-13.
USPTO Office Action, Dated Jan. 15, 2010, in Re Albertson (U.S. Appl. No. 11/622,684, filed Jan. 12, 2007), pp. 1-24.
USPTO Office Action, Dated Jan. 14, 2010, in Re Albertson (U.S. Appl. No. 11/622,693, filed Jan. 12, 2007), pp. 1-23.
Notice of Allowance, U.S. Appl. No. 11/622,679, filed Jan. 12, 2007, in Re Jacob C Albertson, International Business Machines Corporation, mailing date May 21, 2012, 15 pages.
U.S. Appl. No. 13/543,476, filed Jul. 6, 2012, in Re Jacob E Albertson, International Business Machines Corporation, 68 pages.
Office Action, U.S. Appl. No. 13/543,476, filed Jul. 6, 2012, in re Albertson, mailing date Mar. 18, 2013, 75 pages.
Notice of Allowance, U.S. Appl. No. 13/543,476, filed Jul. 6, 2012, In Re Jacob E Albertson, International Business Machines Corporation, mailed Jun. 25, 2013, 24 pages.

* cited by examiner

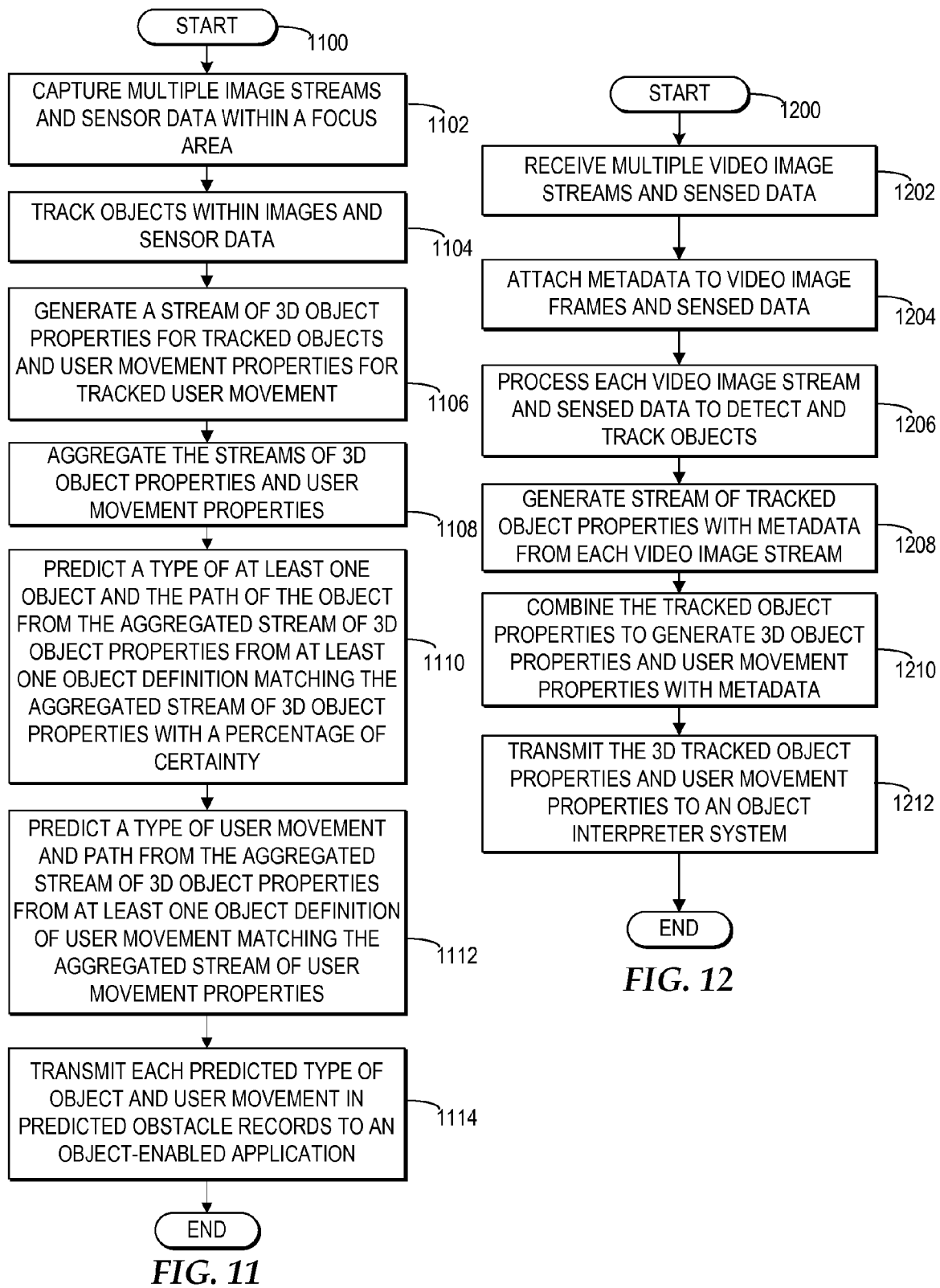

ASSISTING A VISION-IMPAIRED USER WITH NAVIGATION BASED ON A 3D CAPTURED IMAGE STREAM

TECHNICAL FIELD

The present invention relates in general to improved 3D object identification. In particular, the present invention relates to detecting, from a three-dimensional (3D) image stream of an environment captured by one or more image capture devices, 3D objects and assisting a vision-impaired user by providing information about the environment based on the 3D objects identified in the 3D image stream.

DESCRIPTION OF THE RELATED ART

Many people have different degrees of impaired vision. In one example, one with impaired vision may rely on a walking cane or other traditional handheld navigation device that allows the vision-impaired person to detect or feel potential obstacles through tapping with the cane or other device. In another example, as electronic navigation systems improve, a vision-impaired user may rely on an electronic navigation system to detect the GPS location of the user, match the GPS location of the user to a map of an area, and speak directions to the user based on the user's location within a mapped area and any obstacles statically marked in the mappings.

A limitation of traditional handheld navigation devices and electronic navigation devices, however, is that neither of these types of devices alerts the user to potential obstacles that are not detected by the handheld navigation device or included in the maps used by electronic navigation devices. For example, a vision-impaired user would not be alerted, through each of these types of devices, to a stationary, low hanging pole that the user could walk into. In another example, a vision-impaired user would not be alerted, through each of these types of devices, to a moving object that could hit the user, such as a baseball soaring out from a stadium or a turning vehicle. In particular, a vision-impaired user would not be alerted, through each of these types of devices, to potential obstacles coming from any direction, including from behind the user, below the user, or above the user.

In view of the foregoing, there is a need for an electronic navigation method, system, and program for detecting three-dimensional movement of objects within a potential path of a user and alerting the user to the potential obstacles.

SUMMARY OF THE INVENTION

Therefore, one embodiment of the invention provides for an electronic navigation method, system, and program for detecting, from a 3D image stream of an environment captured by one or more image capture devices, 3D objects and assisting a vision-impaired user by providing information about the environment based on the 3D objects identified in the 3D image stream.

In one embodiment, a computer-implemented method for assisting a user with information about an environment relative to the user is directed to capturing a three-dimensional movement of a moving object within the environment, wherein the three-dimensional movement is determined using at least one image capture device aimed at the moving object. The method is directed to predicting a physical movement mobile path of the user based on a detected direction and pace of the physical movement of the user. The method is directed to determining whether the movement of the moving object will intersect with the mobile path of the user. The method is directed to informing the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

In another embodiment, a system for assisting a user with information about an environment relative to the user comprises an object processing system, comprising at least one processor, operative to capture a three-dimensional movement of a moving object within the environment, wherein the three-dimensional movement is determined using at least one image capture device aimed at the moving object, predicting a physical movement mobile path of the user based on a detected direction and pace of the physical movement of the user, and determining whether the movement of the moving object will intersect with the mobile path of the user. The system comprises a navigation system, comprising at least one additional processor, operative to receive from the object processing system the determination whether the movement of the moving object will intersect with the mobile path of the user and control outputs for informing the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

In another embodiment, a computer program product for assisting a user with information about an environment relative to the user comprises one or more computer-readable tangible storage devices. The computer program product comprises program instructions, stored on at least one of the one or more storage devices, to capture a three-dimensional movement of a moving object within the environment, wherein the three-dimensional movement is determined using at least one image capture device aimed at the moving object. The computer program product comprises program instructions, stored on at least one of the one or more storage devices, to predict a physical movement mobile path of the user based on a detected direction and pace of the physical movement of the user. The computer program product comprises program instructions, stored on at least one of the one or more storage devices, to determine whether the movement of the moving object will intersect with the mobile path of the user. The computer program product comprises program instructions, stored on at least one of the one or more storage devices, to inform the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

In addition, one or more 3D characteristics of a stationary object within the environment are captured from at least one image capture device aimed at the stationary object. A determination is made whether the stationary object will intersect with the mobile path of the vision-impaired user. The vision-impaired user is informed whether the stationary object will intersect the mobile path of the vision-impaired user.

In addition, to provide a vision-impaired user within information about the environment, a 3D object properties stream is identified using the captured three-dimensional movement of the moving object, a particular type of object representing the 3D object properties stream is identified by comparing the identified 3D object properties stream with a plurality of object definitions for the environment, and in response to identifying the particular type of object from among the plurality of object definitions, the vision-impaired user is informed of the type of moving object detected within the environment. A type of object includes identifying the shape of the moving object, the name of the moving object, and a surface characteristic of the moving object.

In capturing a 3D movement of a moving object, a stereoscopic video capture device identifies and tracks the 3D movement of a particular moving object. In addition, in capturing 3D movement of a moving object, at least one stereoscopic video capture device and at least one sensor enabled device enable detecting a distance to the moving object in the environment.

In informing the vision-impaired user whether an object will intersect the mobile path of the vision-impaired user, a navigation system generates a feedback pattern for output to a feedback device detected by the vision-impaired user to warn the vision-impaired user of the object. In addition, in informing the vision-impaired user whether the object will intersect the mobile path of the vision-impaired user, a navigation system generates a feedback pattern for output to a feedback device detected by the vision-impaired user to direct the vision-impaired user to adjust a current path to avoid the moving object. The feedback pattern includes audible or tactile patterns for output to an audio feedback device or tactile-feedback device. Further, in informing the vision-impaired user whether the movement of the moving object will intersect the mobile path of the vision-impaired user, a navigation system generates a tactile feedback pattern for output to a tactile feedback device detected by the vision-impaired user to enable the vision-impaired user to virtually detect to feel the three-dimensional surface of the moving object.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11 is a high level logic flowchart illustrating a process and program for an object processing system to predict object types and paths with a percentage of certainty and to detect and predict user movement and paths;

FIG. 12 is a high level logic flowchart depicting a process and program for gesture detection by tracking objects within image streams and other sensed data and generating 3D object properties for the tracked objects;

DETAILED DESCRIPTION OF THE PREFERRED EMBODIMENT

It is important to note that as used throughout, the term "object" may include moving and stationary objects. An "object" may represent an actual or a potential obstacle to a vision-impaired user. In addition, the term "object" may include gestures made by other persons or animals, where a gesture may include user actions typically labeled as gestures and may also include any detectable body movements, body posture, and other types of non-verbal communication.

In addition, it is important to note that while the present invention is described throughout with reference to a "vision-impaired user", the present invention may be used by any user. A "vision-impaired user" refers to a user whose vision is impaired in some way such that the present invention provides information about a user's environment which would otherwise not be accessible to the user.

Figure 1:
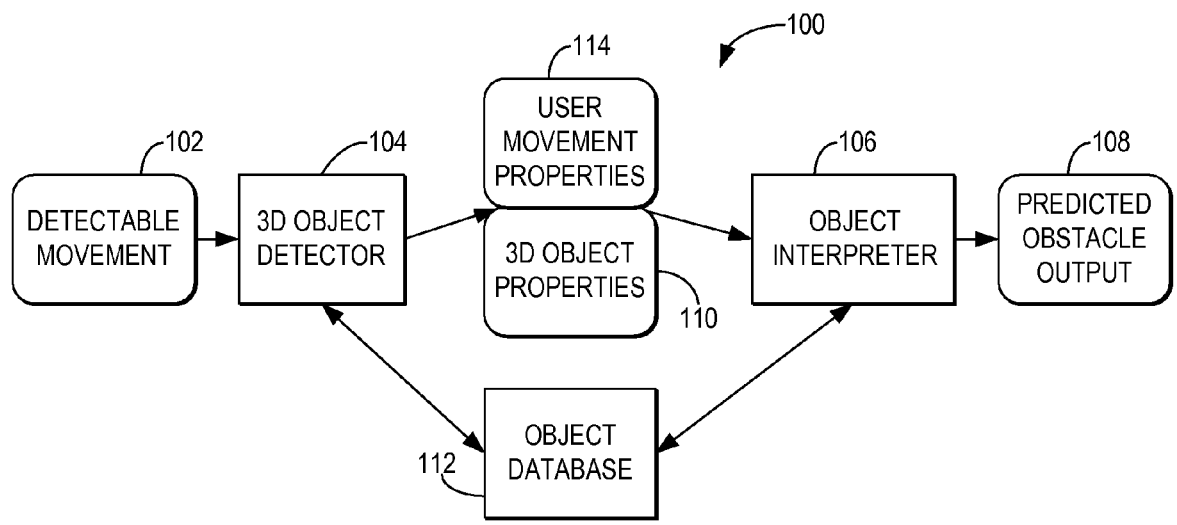
FIG. 1 is a block diagram illustrating a flow of information in an object processing method, system, and program.

With reference now to FIG. 1, a block diagram illustrates a flow of information in an object processing method, system, and program. In the example, an object processing system 100 includes a three-dimensional (3D) object detector 104. 3D object detector 104 represents multiple systems for capturing images and other data about moving and stationary objects, streaming the captured data, tracking particular objects within the captured movement, streaming the properties of the particular objects, and combining the streamed properties into a three-dimensional representation of the 3D properties of the captured objects, as illustrated by 3D object properties 110. Object properties may include, but are not limited to, positions, color, size, and orientation. In particular, an object property may include the distance from one or more image capturing devices to an object.

In addition to identifying and tracking objects, based on the captured images and data, 3D object detector 104 detects images and other data that indicate the movement of a vision-impaired user and combines the detected images and data into a three-dimensional representation of the 3D properties of the movement of the vision-impaired user, as illustrated by 3D user movement properties 114.

3D object detector 104 captures images and other data within at least one area, represented as detectable environment 102. In particular, 3D object detector 104 detects detectable environment 102 through multiple types of image and data detection including, but not limited to, capturing video images, detecting body part movement, detecting skin or surface texture, detecting skin or surface color, capturing thermal images, detecting GPS locations, and detecting radio frequency identifier (RFID) information. For supporting multiple types of image and data detection, 3D object detector 104 may include or access multiple types of image capture devices, including one or more video cameras arranged for stereoscope video image capture, and other types of sensors, such as RFID readers, GPS systems, thermal body imaging sensors, surface texture and color sensors, laser sensing devices, sound navigation and ranging (SONAR) devices, or synthetic laser or sonar systems. In particular, 3D object detector 104 not only captures images for enabling a mapping of a 3D image of an object, but also for detecting images within a detectable environment 102 which may represent a 360 degree range of space around a person.

3D object detector 104 translates detectable environment 102 into a stream of 3D properties of detected objects and user movement and passes the stream of 3D object properties 110 and user movement properties 114 to object interpreter 106. Object interpreter 106 maps streamed 3D object properties 110 into one or more types of objects and estimates, for each predicted type of object, the probability that the detected movement or stationary positions of the detected objects represents the type of object. Examples of predicted types of object movement may include, but are not limited to, a swinging rope, a soaring baseball, dangling legs. Examples of predicted types of stationary object positions may include, but are not limited to, a parked car, a tree branch, a pole, or a stairway.

In addition, for a vision-impaired user, object interpreter 106 maps the path of the vision-impaired user from user movement properties 114 and detects the type of movement. Examples of types of movement may include the user's physical movement, such as the user running, walking, sitting or standing or the user's movement in relation to another object, such as the user sitting in a moving bus, the user standing in a rocking boat, or the user riding a bike. In one example, user movement properties 114 may include movement properties detected from an accelerometer, which measures and reports on its own motion, where the accelerometer is coupled to the user.

Further, object interpreter 106 may predict the path of the vision-impaired user and whether an object will be an obstacle to the user within the predicted path. Additionally, for a moving object, object interpreter 106 may predict the path of the moving object and predict whether the object will affect the user.

Object interpreter 106 outputs the object type, path, and location of each detected object with a percentage certainty as to the object type as predicted obstacle output 108. In addition, object interpreter 106 outputs user movement, including a path of user movement and specific types of movement as predicted obstacle output 108. For example, predicted obstacle output 108 may indicate that detected user movement indicates that the user is walking and indicates the direction and pace that the user is walking.

According to an advantage, object interpreter 106 may pass predicted obstacle output 108 to an object-enabled application, such as a navigation application, that receives predicted obstacle output 108, analyzes predicted obstacle output 108, and controls output of predicted obstacle output 108 to a vision-impaired user. By passing detected object types, paths, and locations and user movement, paths, and locations to a navigation application, where the object and user movement are detected from images and data captured to enable a 3D mapping of an environment, the navigation application is provided with information to enable the navigation application to direct the vision-impaired user to safely interact with the actual 3D environment.

In processing detectable environment 102 and generating predicted obstacle output 108, 3D object detector 104 and object interpreter 106 may access an object database 112 of previously accumulated and stored object definitions to better detect objects within detectable environment 102, to better predict types of objects from detectable environment 102, to better predict paths of moving objects from detectable environment 102, to better map positions of stationary objects from detectable environment 102, to better detect user movement within detectable environment 102, and to better detect a user path from detectable environment 102. Object database 112 may include multiple categories of object definitions and location mappings, as will be further described with reference to FIG. 4. In predicting a type of object, a shape of the object, a name of the object, a surface characteristic of the object, other types of identifier for the object may be generated.

In processing detectable environment 102, within object processing system 100, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D object detectors or between object interpreters, such that with the combination of data, object interpreter 106 may interpret types of objects with greater accuracy.

As will be further described, object interpreter 106 may output predicted obstacle output 108 to an output interface, where the output interface controls audio or tactile based outputs representative of predicted obstacle output 108. The audio or tactile based outputs may be finely tuned to provide the vision-impaired user with warning, interaction, directions, and other information about objects.

Figure 2:
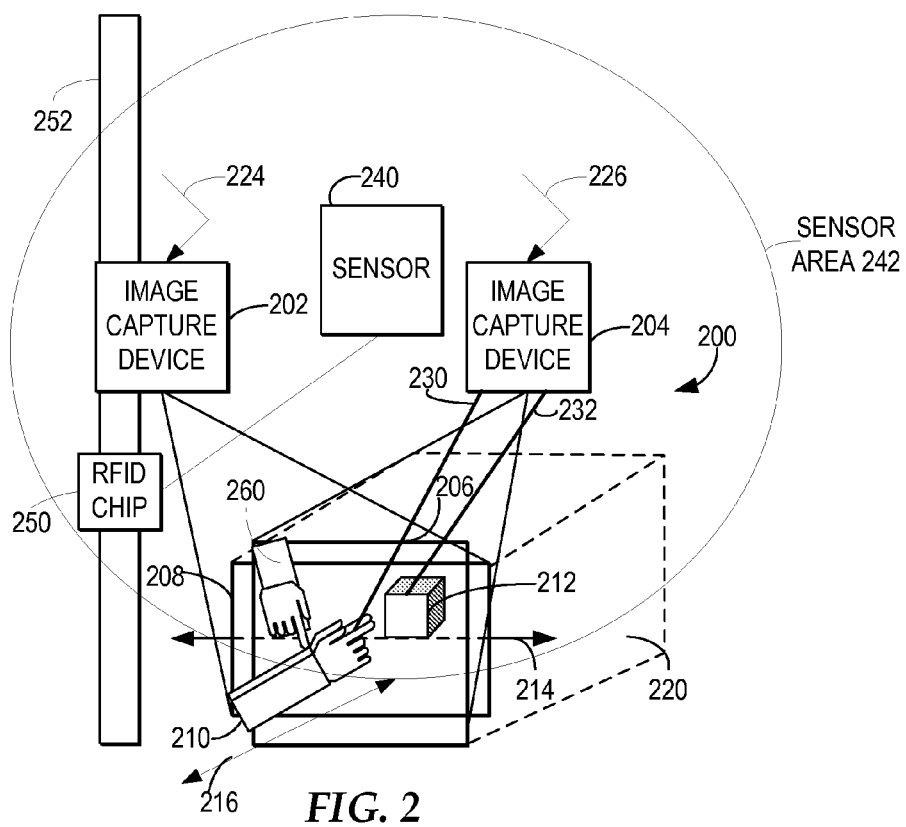
FIG. 2 is an illustrative diagram depicting an example of an environment in which a 3D object detector captures and generates the 3D object properties and user movement properties representative of detectable movement.

Referring now to FIG. 2, an illustrative diagram depicts an example of an environment in which a 3D object detector captures and generates the 3D object properties and user movement properties representative of detectable movement. It will be understood that detectable movement environment 200 is one example of an environment in which 3D object detector 104 detects images and data representative of detectable environment 102, as described with reference to object processing system 100 in FIG. 1. Other environments may be implemented in which detectable movement is detected and processed.

In the example, detectable movement environment 200 includes a stereoscopic capture device comprising an image capture device 202 and an image capture device 204, each positioned to detect movement of one or more objects within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

Further, in the present embodiment, image capture device 202 and image capture device 204 may be affixed to an apparatus that is carried by or worn by a vision-impaired user. For example, image capture device 202 and image capture device 204 may be affixed to a pair of glasses or other headwear for a vision-impaired user, such that 3D focus area 220 changes as the user moves.

Although not depicted, in another embodiment, only a single video camera, such as image capture device 202, may be implemented as a stereoscopic image capture device. The single video camera is placed on a track or other adjustable axis and a controller adjusts the position of the single video camera along the track, wherein the single video camera then captures a stream of video images within a focus area at different positioned points along the track and 3D gesture detector 104 combines the stream of images into a 3D object property stream of the properties of detectable objects.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220.

In the example, within 3D focus area 220, a hand 210 and a hand 260 each represent moving objects and a box 212 represents a stationary object. In the example, hand 210 and hand 260 represent the portion of one or more person's hand within 3D focus area 220. A person may make any number of gestures or movements towards a vision-impaired user, by moving hand 210 or hand 260. In addition, hand 210 or hand 260 may be the vision-impaired user's hand. As one or more persons move hand 210 and hand 260 within 3D focus area, each of image capture device 202 and image capture device 204 capture a video stream of the movement of hand 210 within capture plane 206 and capture plane 208. From the video streams, 3D object detector 104 detects hand 210 and hand 260 each as a moving object within 3D focus area 220 and generates a 3D property stream, representative of 3D object properties 110, of each of hand 210 and hand 260 over a period of time.

In addition, a person may move hand 210 or hand 260 in relation to box 212. As the person moves hand 210 or hand 260 within 3D focus area 220, the video streams captured by image capture device 202 and image capture device 204 include the movement of hand 210 or hand 260 and box 212. From the video streams, 3D object detector 104 detects hand 210 and hand 260 as moving objects and box 212 as a stationary object within 3D focus area 220 and generates 3D object property streams indicating the 3D properties of box 212 and the 3D properties of hand 210 and hand 260 each in relation to box 212 over a period of time.

Based on the streams received from image capture device 202 and image capture device 204, 3D object detector 104 detects the proximity of hand 210 and box 212 in relation to image capture device 202 and image capture device 204 and detects changes in the proximity of hand 210 and box 212 to image capture device 202 and image capture device 204, such as by detecting a distance to one or more points within focus area 220, such as a distance 230 to hand 210 and a distance 232 to box 212. In one example, the images captured from image capture device 202 and image capture device 204 enable distance detection. In another example, an additional sensor coupled to image capture device 202 and image capture device 204, such as sensor 240, enables distance detection. By 3D object detector 104 detecting the proximity of hand 210 and box 212 to image capture device 202 and image capture device 204, object interpreter 108 may detect a speed at which an object approaches image capture device 202 and image capture device 204.

Additionally, based on the streams received from image capture device 202 and image capture device 204, 3D object detector 104 detects the proximity of hand 210 and hand 260 to one another. Additionally, in one example, where hand 210 is associated with a first vision-impaired user and hand 260 is associated with a second vision-impaired user, the image capture devices or the full object processing systems for the two vision-impaired users may exchange information with one another. In one example, image capture devices associated with different vision-impaired uses or the full object processing systems for different users may connect through wired or wireless connections. The different object processing systems process captured images of hand 210 and hand 260 from the perspectives of each of the vision-impaired users and share processed information with other object processing systems to enable each object processing system to more accurately detect and predict objects. Additionally, the different sets of image capture devices may stream images with additional information, such as relative location and orientation, such that the object processing systems for each vision-impaired user receive images streamed from multiple perspectives of image capture devices.

By coordinating sharing of information between image capture devices or full object processing systems, each object processing system may more accurately monitor the position of hand 210 and hand 260 and more accurately direct each vision-impaired user which direction to move that user's hand so that the users can shake hands. As will be further described, a navigation system receives the predicted obstacle output and directs the movement of a vision-impaired user to avoid an obstacle, or in the example, to shake another person's hand.

In addition, as previously noted, advantageously each of image capture device 202 and image capture device 204 may adjust in position, such as when worn by a vision-impaired user. In one example, a 3D change in position of each of image capture device 202 and image capture device 204 may be tracked based on changes in the relative position of stationary objects within focus area 220 or other sensed information. In the example, the tracked path of each of image capture device 202 and image capture device 204 is illustrated by tracked path line 224 and tracked path line 226, respectively. By 3D object detector 104 detecting the proximity of hand 210, hand 260, and box 212 in relation to image capture device 202 and image capture device 204 and detecting the tracked path of image capture device 202 and image capture device 204, object interpreter 108 may detect the relative movement of objects approaching image capture device 202 and image capture device 204 with respect to the movement of a vision-impaired user wearing image capture device 202 and image capture device 204, predict the path of movement of the vision-impaired user, and predict whether any of the detected objects will be obstacles in that path.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including distance, within 3D focus area 220. In addition, the more accurately that 3D object detector 104 defines a 3D representation of a moving object, the more accurately object interpreter 106 can predict a type of object and the path of the object from the 3D model. For example, a type of object could consist of a person making a motion directly towards or away from one of image capture device 202 and image capture device 204 which would not be able to be captured in a two dimensional frame; 3D object detector 104 detects and defines a 3D representation of the movement as a moving object and object interpreter 106 predicts the potential obstacle made by the movement towards or away from a video camera from the 3D model of the movement.

In addition, it is important to note that while FIG. 2 illustrates moving hand 210, moving hand 260, and a stationary box 212, in alternate embodiments, 3D focus area 220 may include multiple separate people moving in one or more directions and multiple objects moving in one or more directions or remaining stationary but approached by a vision-impaired user, that image capture device 202 and image capture device 204 capture images of multiple people and multiple objects, and 3D object detector 104 detects the movement by each person and object as a separate object.

In the example, in addition to capturing images within focus area 220, within detectable movement environment 200, other sensors may detect information relevant to navigation outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object positions 110 and user movement positions 114.

In one example, sensor 240 may detect information broadcast from RFID chips placed on objects within sensor area 242, where the RFID of an object broadcasts the object type and the object location. In another example, sensor 240 may broadcast an RFID for a user and receive, from other transmitters broadcasting within sensor area 242, information specified for that user for a particular area. For example, an RFID chip, such as RFID chip 250, placed on a street lamp 252 at an intersection may broadcast within sensor area 242 that the street lamp is on the intersection of two streets and indicate directionally, such as north-east, the corner of the intersection. By combining sensed information about the location of a particular object with captured images from which the image is identified, object detector 104 may more accurately generate 3D object positions 110 and object interpreter 106 may more accurately predict the types of 3D objects detected within 3D object positions 110. In particular, once 3D object interpreter 106 identifies the street lamp object within 3D object positions 110, then object interpreter 106 may access street intersection based object definitions from object database 112 to more accurately identify the types of objects of other objects detected within 3D object positions 110.

In another example, sensor 240 may detect a changing GPS location of sensor area 242. By detecting a changing GPS location of sensor area 242 that correlates with the movement of a vision-impaired user, object detector 104 may more accurately monitor the movement of the vision-impaired user and predict the path of the vision-impaired user. In addition, by detecting GPS coordinates, object interpreter 106 or a navigation application receiving predicted object output 108 may compare the user position with a map to detect and predict a user's path.

Figure 3:
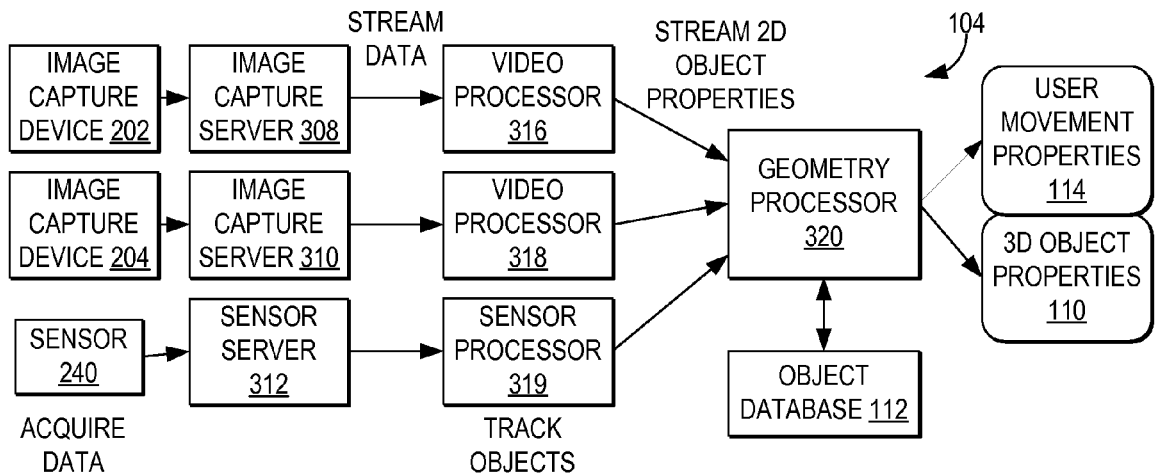
FIG. 3 is a block diagram illustrating one embodiment of a 3D object detector system.

With reference now to FIG. 3, a block diagram illustrates one embodiment of a 3D object detector system. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object properties 324.

Initially, multiple image capture devices, such as image capture device 202, image capture device 204 and sensor 240, represent a stereoscopic image capture device for acquiring the data representative of detectable environment 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable environment 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 may represent one or more different types of sensors, including, but not limited to, RFID readers, thermal body imaging sensors, skin texture sensors, laser sensing devices, sound navigation and ranging (SONAR) devices, or synthetic laser or sonar systems. In addition, sensor 240 may include sensors that detect a particular type of body part, a particular type of body movement, or skin texture.

In particular, sensor 240 detects information about objects in a particular sensor area that enhances the ability of 3D object detector 104 to create 3D object properties 110 and user movement properties 114. For example, by implementing sensor 240 through a SONAR device, sensor 240 collects additional information about the depth of an object and the distance from the SONAR device to the object, where the depth measurement is used by one or more of video processor 316, video processor 308, or a geometry processor 320 to generate 3D object properties 110 and user movement properties 114. If sensor 240 is attached to a moving object, a synthetic SONAR device may be implemented.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images.

In the example, video processor 316, video processor 318, and sensor processor 319 each create and stream the properties, including positions, color, size, and orientation, of the detected objects and user movement to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected within a single frame, the X axis coordinates and Y axis coordinates for each object may be included in a single streamed object property record or in multiple separate streamed object property records.

Geometry processor 320 receives the 2D streamed object properties from video processor 316 and video processor 318 and the other object and user movement data from sensor processor 319. Geometry processor 320 matches up the streamed 2D object properties and other object and user movement data and constructs 3D object properties 110 of each of the detected objects and user movement properties 114 from the streamed 2D object properties and other data. In particular, geometry processor 320 may construct 3D object properties 114 that include the depth of an object and the distance of the object from the user. In one example, each 3D object property record and user movement property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement.

In particular, by video processor 316, video processor 318, and sensor processor 319 identifying and classifying object properties, each of the processors may access object database 112 for accessing previously processed inputs and gesture mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from object database 122. Further, object database 122 may store the streamed 2D object properties and 3D object properties for future reference.

In addition, by video processor 316, video processor 318, and sensor processor 319 identifying and classifying object properties and in geometry processor constructing 3D object properties 110 and user movement properties 114, each of the processors may identify detected objects or the environment in which an object or the user is located. For example, video processor 316, video processors 318, sensor processor 319, and geometry processor 320 may access object database 322, which includes specifications for use in mapping facial expressions, performing facial recognition, and performing additional processing to identify an object representing a gesture. In addition, video processor 316, video processors 318, sensor processor 319, and geometry processor 320 may access object database 322, which includes specifications for different types of environments for use in identifying a particular environment in which a user is located based on detected objects and background. Further, in constructing 3D object properties 110 and user movement properties 114, video processor 316, video processors 318, sensor processor 319, and geometry processor 320 may identify the interactions between multiple detected objects in the environment in which the objects are located.

Figure 4:
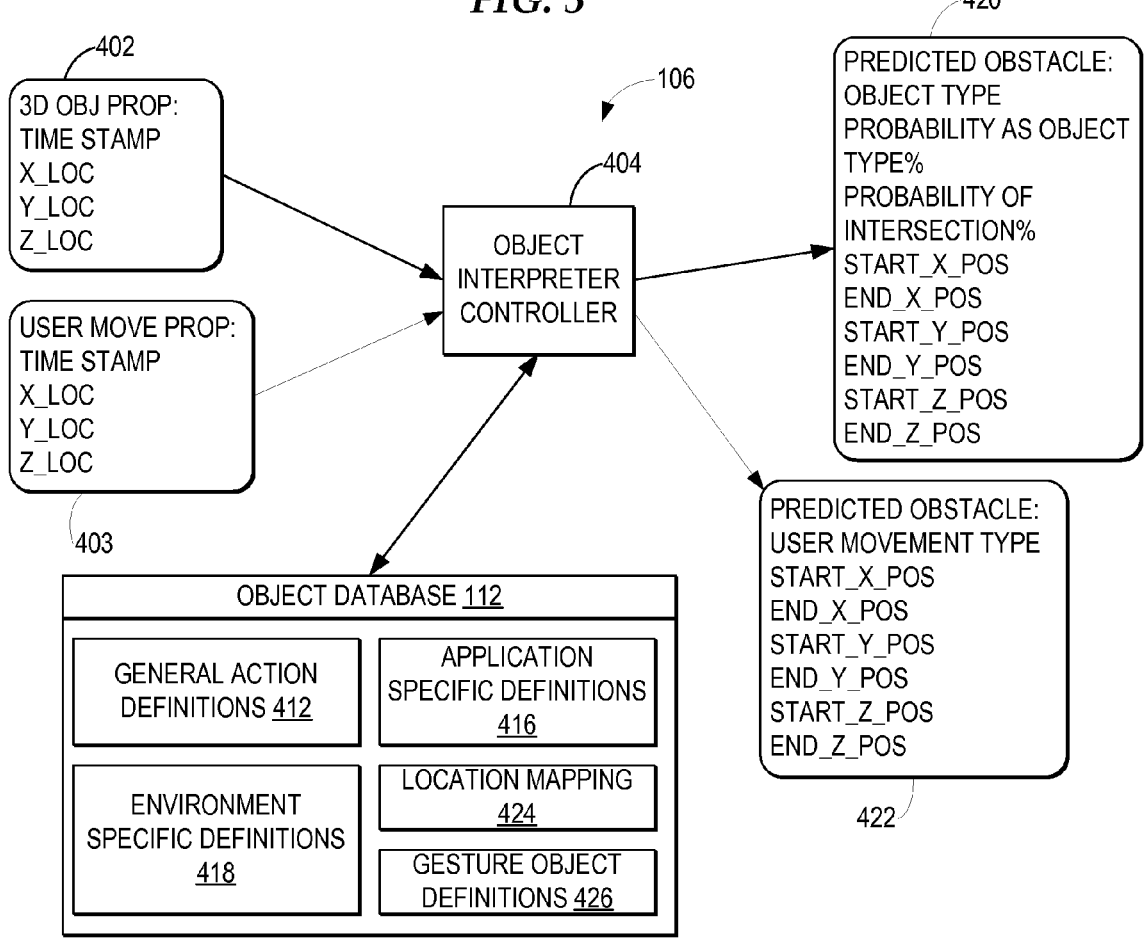
FIG. 4 is a block diagram depicting one embodiment of an object interpreter system.

Referring now to FIG. 4, a block diagram illustrates one embodiment of an object interpreter system. It is important to note that the multiple components depicted within 3D object interpreter 106 may be incorporated within a single system or distributed via a network across multiple systems. In the example, a 3D properties record 402 includes "time stamp", "x_loc", "y_loc", and "z_loc" data elements and a user movement properties record 403 includes an identifier as "user movement", a "time stamp", and "x_loc", "y_loc" and "z_loc" coordinates. It will be understood that 3D properties record 402 and user movement properties record 403 may include additional or alternate data elements as determined by geometry processor 320 of FIG. 3. For example, 3D properties record 402 or user movement properties record 403 may include additional information detected from a GPS system, indicating GPS location coordinates or additional information detected from an RFID chip, indicating an object type and location.

3D object interpreter 106 includes an object interpreter controller 404, where object interpreter controller 404 may include one or more processors programmed to perform object interpretation. For example, object interpreter controller 404 may include a processor with the CellBE architecture, programmed to efficiently process 3D object properties data streams and predict objects from the 3D object properties streams and to efficiently process 3D user movement properties data streams and predict user movement from the 3D object properties streams. In addition, object interpreter controller 404 may include processors upon which software runs, where the software directs processing of 3D object properties streams and 3D user movement properties streams and predicts types of objects and user movement from the 3D object properties streams and 3D user movement properties.

In processing 3D object properties streams and predicting types of objects, object interpreter controller 404 maps 3D object properties to one or more types of objects with a percentage certainty that the streamed 3D object properties represent the mapped type of object for a particular environment and a particular vision-impaired user. In particular, object interpreter controller 404 accesses one or more object definitions for one or more objects and determines whether the 3D object properties match one or more characteristics of one or more objects as defined in one or more of the object definitions. Object definitions may include mapped 3D models of one or more types of objects. In addition, object definitions may define the parameters of identifying characteristics of an object including, but not limited to, body part detected, type of movement, surface characteristics, shape, speed of movement, frequency, span of movement, depth of movement, temperature, and color.

It is important to note that in interpreting 3D object properties streams, object interpreter controller 404 performs an aggregate analysis of all the tracked objects in one or more 3D object properties streams identified for a particular focus area by one or more object detector systems. In one example, object interpreter controller 404 aggregates the 3D object property streams for a particular focus area and particular sensor area. In another example, object interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, object interpreter controller 404 may map the aggregate of the tracked objects directly into a single object definition. In another embodiment, object interpreter controller 404 maps multiple aggregated tracked objects into multiple object definitions.

In the example, object interpreter controller 404 accesses object definitions from object database 112, which includes general action definitions 412, environment specific definitions 414, application specific definitions 416, user specific definitions 418, and location mapping 424. It will be understood that object database 112 may include additional or alternate types of object definitions. In addition, it is important to note that each of the groupings of object definitions illustrated in the example may reside in a single database or may be accessed from multiple database and data storage systems via a network.

General action definitions 412 include objects definitions for common objects. For example, general action definitions 412 may include object definitions for common stationary objects, such as brick walls, chain link fencing, monitors, sink handles and common moving objects, such as cars, planes, bikes, sport balls, images on a monitor, and people moving, such as moving heads, arms, and legs.

Environment specific definitions 414 include object definitions specific to the environment in which the object is being detected; how an object is defined and whether an object is considered an obstacle may vary based on the environment. Examples of environments may include, but are not limited to, the current location of the vision-impaired user, the current actions by the vision-impaired user, the time of day, the languages spoken by the vision-impaired user, and other factors that influence the environment in which objects could be interpreted. The current location of a vision-impaired user may include the country or region in which the user is located, the building in which the user is located, the street on which a user is standing, the vehicle in which the user is traveling, for example. The current actions of a vision-impaired user may include actions such as the user walking, sitting, standing, exercising, or sleeping.

In addition to detecting an environment from captured images and sensor data, object interpreter controller 404 may detect information about a current environment from accessing an electronic calendar for a vision-impaired user to detect the user's scheduled location and additional context information about that location, from accessing a GPS indicator, from performing speech analysis of the vision-impaired user's speech to detect the type of language spoken, from detecting objects within the image data indicative of particular types of locations, or from receiving additional data from other systems monitoring the environment in which a vision-impaired user is located. In one example, if object interpreter controller 404 receives object properties that include data gathered about a local object from an RFID chip, object interpreter controller 404 may determine, from the data, the type of environment in which a user is located and access object definitions for the type of object identified in the RFID data for the particular type of environment.

Application specific definitions 416 include object definitions specific to the object-enabled application to which predicted object output 108 will be sent. For example, in the present embodiment, predicted object output 108 may be output to a navigation system that provides a vision-impaired user with navigation information about the user's environment, including information about obstacles from moving objects and stationary objects and information about gestures made by others. Object database 112 may include object definitions for types of objects, including gesture movements, which have been determined to be more likely to occur or be of greater relevance to a vision-impaired user using a navigation system.

User specific definitions 418 include object definitions specific to the vision-impaired user. In particular, object interpreter controller 404 may access an identifier for a vision-impaired user from the user logging in to a navigation system, from matching a biometric entry by the user with a database of biometric identifiers, from the user speaking an identifier, or from other types of identity detection. In addition, object interpreter controller 404 may learn, through sampling or input by the vision-impaired user, objects typical of the vision-impaired user's environment, objects typically considered obstacles by the vision-impaired user, and other user specific information about obstacles and the user's movement.

Location mapping 424 includes mappings of different locations with different levels of detail. For example, one level of mappings may provide markers for streets and buildings, based on a satellite image of a particular area, from the outside. In another example, one level of mappings may provide the interior layout of a building, with walls, doors, fixtures, stairs, and other landmarks marked. Object interpreter controller 404, upon receiving identifying information about a vision-impaired user's location, may detect a map from location mapping 424 to further predict the types of objects detected and to more accurately predict a user's path.

Gesture object definitions 426 include object definitions for gestures made by a person or animal. Gesture object definitions 426 include object definitions for gestures corresponding to different types of cultures, regions, and languages. In addition, gesture object definitions 426 include gesture definitions adjusted according to a corresponding facial expression or other gesture. Further, gesture object definitions 426 may be trained to more accurately identify objects representing particular people, animals, places, or things that a particular user most commonly interacts with and therefore provide more specified object definitions.

Further, within the available object definitions, at least one object definition may be associated with a particular area of movement or a particular depth of movement. The 3D focus area in which movement is detected may be divided into separate 3D portions, where movements made in each of the portions may be interpreted under different selections of object definitions. For example, one three-dimensional portion of a focus area may be considered an "active region" where movement detected within the area is compared with a selection of object definitions associated with that particular active region.

Once object interpreter controller 404 identifies an object, an object path, and user movement, object interpreter controller 404 may predict whether an object may be an obstacle in a user's path. For example, once object interpreter controller 404 detects that a user is walking a particular direction on a sidewalk, object interpreter controller 404 may predict the objects detected within a user's path that may be obstacles in the user's path.

Object interpreter controller 404 may output predicted obstacle output 108 in the form of one or more object records, such as object record 420 and object record 422. Object record 420 indicates the "object type" and "probability %" indicative of the certainty that the detected movement is the predicted object type, and the "probability of intersection". In addition, object record 420 includes the start X, Y, and Z axis properties and ending X, Y, and Z axis properties of the object, indicative of the location, direction of movement, and speed of movement of the object, listed as "start_x_pos", "end_x_pos", "start_y_pos", "end_y_pos", "start_z_pos", "end_z_pos". In another example, object record 422 indicates the "user movement direction", the "probability %" indicative of the certainty of the user movement in a particular path, and X, Y, and Z axis start and ending properties of the user movement, indicative of the location, direction of movement, and speed of movement of the user. Further, additional information acquired from sensors, such as RFID data, GPS coordinates, temperatures, and other sensed data, may be associated with a particular object record or included in a separate object record.

In passing object record 420 and object record 422, object interpreter controller 404 may filter out particular types of object records. For example, object interpreter controller 404 may not pass records where the predictability of an object as an obstacle is less than a particular percentage.

It is important to note that in an alternate embodiment, obstacle interpreter controller 404 may only predict an object type, object path, and user movement and pass records for all detected objects and all detected user movement to an object-enabled application. The object-enabled application then predicts which objects may be obstacles to the vision-impaired user and controls how the user is informed of object obstacles.

Figure 5:
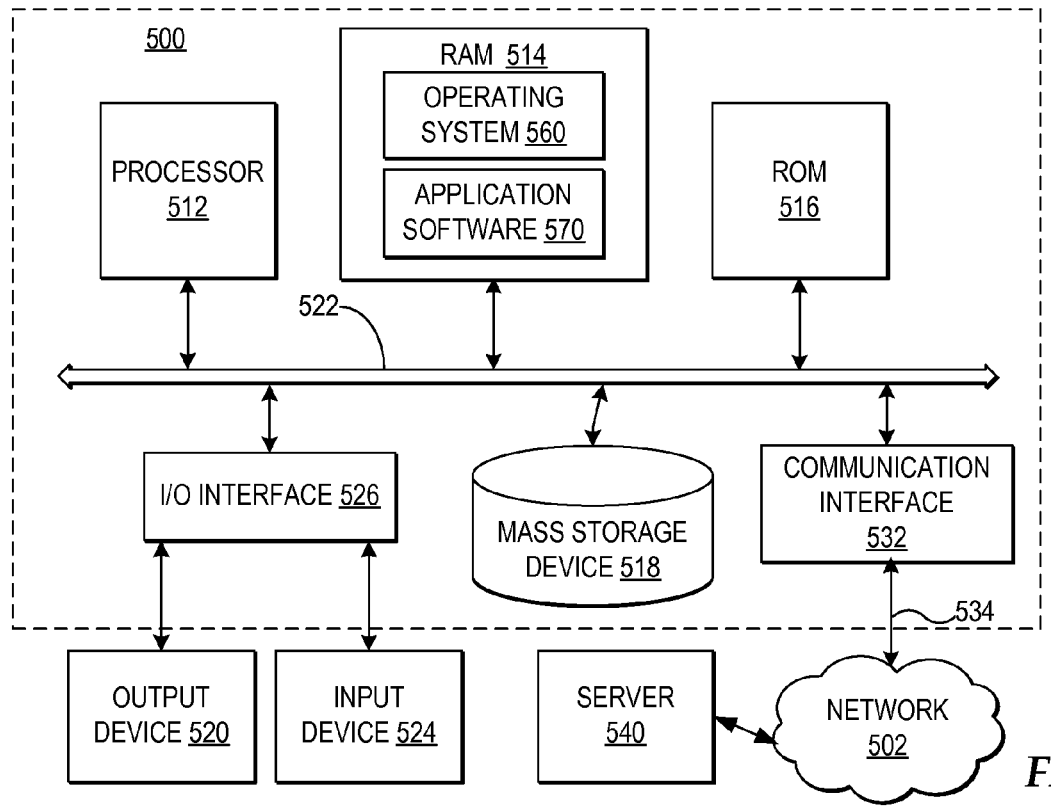
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D object detection from captured images and data, object prediction from the detected 3D objects, object movement prediction, user path prediction, and navigation information, including whether an object is predicted to be an obstacle to the user, as depicted in the operations of flowcharts of FIGS. 11-14 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein refers to any data storage medium that participates in providing instructions to processor 512 or other components of computer system 500 for execution. Such a data storage medium may take many forms including, but not limited to, storage type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514.

In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. A communications interface 532, coupled to bus 522, provides a two-way data communications coupling to a network link 534 (e.g. a modem or network connection) that may be connected, for example, to a local area network (LAN), wide area network (WAN), or directly to an Internet Service Provider (ISP), for communicating with another computer, such as server 540. In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
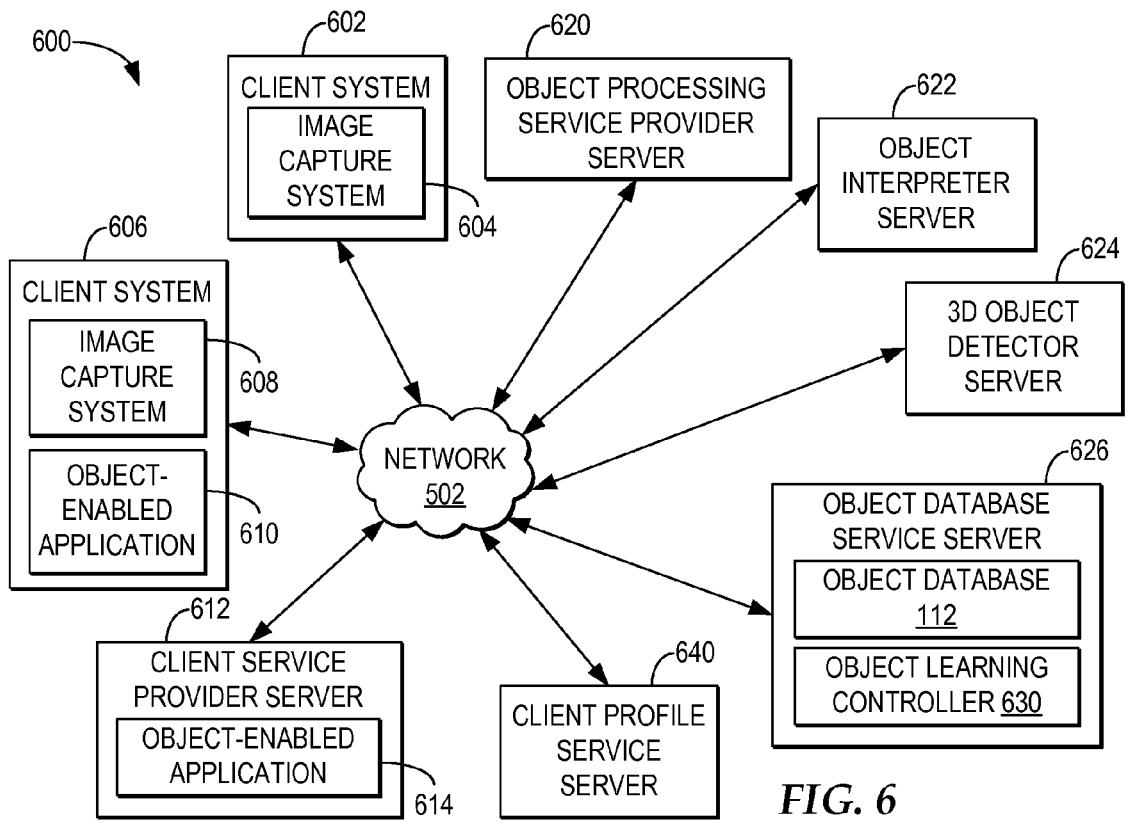
FIG. 6 is a block diagram depicting one example of a distributed network environment in which an object-enabled navigation method, system, and program may be implemented.

Referring now to FIG. 6, a block diagram depicts one example of a distributed network environment in which an object-enabled navigation method, system, and program may be implemented. It is important to note that distributed network environment 600 is illustrative of one type of network environment in which the object-enabled navigation method, system, and program may be implemented, however, the object-enabled navigation method, system, and program may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing an object processing system and an object-enabled navigation system. It will be understood that other types of systems and services and other groupings of systems and services in a network environment may implement the object processing system and object-enabled navigation system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting an object processing system and object-enabled navigation system; however other network configurations and network components may be implemented for supporting and implementing the object processing system and object-enabled navigation system of the present invention.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with a stereoscopic image capture system 604 and a client system 606 with a stereoscopic image capture system 608. In one example, stereoscopic image capture systems 604 and 608 include multiple image capture devices, such as image capture devices 202 and 204, and may include one or more sensors, such as sensor 240. Stereoscope image capture systems 604 and 608 capture images and other data and stream the images and other data to other systems via network 502 for processing. In addition, stereoscope image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more object detection services. In one example, an object processing service provider server 620 provides a service that includes both an object detector service for processing streamed images and other data and an object interpreter service for predicting a type of object, predicting a path of a vision-impaired user, and predicting whether the object will be an obstacle in the user's path and controlling output of the predicted data to one or more other systems accessible via network 502.

As to object processing service provider server 620, different entities may implement an object processing service and different entities may access the object processing service. In one example, a user logged into one of client systems 602 or client system 606 may subscribe to the object processing service. In another example, an image capture system or a particular application requesting object processing may automatically stream captured images and data to the object processing service. In yet another example, a business may implement the object processing service in a communications network.

In another example, each of client system 602 and client system 606 may stream captured frames to a 3D object detector server 624. 3D object detector server 624 receives captured images and other data from image capture systems, such as stereoscopic image capture system 604 or stereoscopic image capture system 608, and processes the images and other data to generate 3D properties of detected objects and user movement, for output to an object interpreter system, such as object interpreter server 622 or object processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

In particular to object interpreter server 622 and 3D object detection server 624, each of these servers may be distributed across one or more systems. In particular, each of object interpreter server 622 and 3D object detection server 624 are distributed across systems with 3D image processing power, including processors with the CellBE architecture programmed to perform efficient 3D data processing. In one example, an entity, such as a business or service provider, may implement separate server systems for object detection and object interpretation, wherein multiple object interpreter servers are implemented with each object interpreter server processing different types of 3D properties.

Object processing service provider server 620, object interpreter server 622, and 3D object detection server 624 may locally store an object database, such as object database 112, of raw images, 3D object properties, and object definitions. In addition, object processing service provider server 620, object interpreter server 622 and 3D object detection server 624 may access an object database service server 626 that facilitates object database 112. As previously described, object database 112 may include, but is not limited to, raw images and data, 3D object properties, object definitions, and object predictions.

In addition, object database service server 626 includes an object learning controller 630. Object learning controller 630 prompts users to provide samples of particular types of objects and prompts users to indicate whether a predicted type of object matches an actual object or whether a predicted type of user movement matches the actual movement. In addition, object learning controller 630 may prompt the user to indicate whether a predicted obstacle actually crossed in the user's path. In addition, object learning controller 630 gathers other information that enables object learning controller 630 to learn and maintain object information in object database 112 that when accessed by object detection services and object interpreter services, increases the accuracy of generation of 3D object properties and user movement properties and the accuracy of prediction of types of objects, user paths and objects becoming obstacles by these services.

Further, object processing service provider server 620, object interpreter server 622, 3D object detector server 624, or object database service server 626 may access additional information about the vision-impaired user or a person detected within a focus area from a client profile service server 640. In one example, the additional information accessed about a vision-impaired user aids a server in detecting and mapping user movement, based on previous user movement. In another example, the additional information accessed about a person detected within a focus area provides additional information characteristic of the person, where the addition information characteristic of the person aids a server in predicting whether the person will be an obstacle in the path of the vision-impaired user.

In one example, client profile service provider 640 monitors a vision-impaired user's electronic calendar or a user's current GPS location, for example, from the vision-impaired user's personal, portable telephony device. In another example, client profile service provider 640 stores network accessible locations from which client profile service server 640 may access current vision-impaired user information upon request. In a further example, client profile service provider 640 may prompt a vision-impaired user to provide current interaction information and provide the user's responses to requesting services.

Object processing service provider server 620 and object interpreter server 622 stream predicted obstacle records, such as predicted obstacle records 420 and 422, to object-enabled applications via network 502. An object-enabled application may represent any application enabled to receive and process predicted object inputs.

In the example embodiment, client system 606 includes an object-enabled application 610 which enables client system 606 to function as an object-enabled navigation system. Object-enabled application 610 at client system 606 may receive predicted obstacle records from client system 606, as captured by stereoscopic image capture system 608, or may receive predicted obstacle records based on images and data detected by stereoscopic image capture system 608 or other image capture systems.

In addition, in the example embodiment, client service provider server 612 includes an object-enabled application 614 which enables client service provider server 612 to function as an object-enabled navigation system. Client service provider server 612 represents a server that provides a service to one or more client systems. Services may include providing internet service, communication service, financial service, or other network accessible service. Object-enabled application 614 receives predicted obstacle records at a client system or from an object interpreter service, such as object processing service provider server 620 or object interpreter server 622, and enables the service provided by client service provider server 612 to process and respond to the predicted obstacle records.

In one example, client service provider server 612 provides an electronic navigation service to multiple users for facilitating navigation in multiple, different types of environments.

For example, client service provider server 612 may facilitate navigation when driving, when walking through a mall, or when running outside. Object-enabled application 614 receives descriptions of types of objects, object locations, predicted user paths, and other object information, matches the information with mappings of a particular environment, and generates instructions for guiding user navigation.

Figure 7:
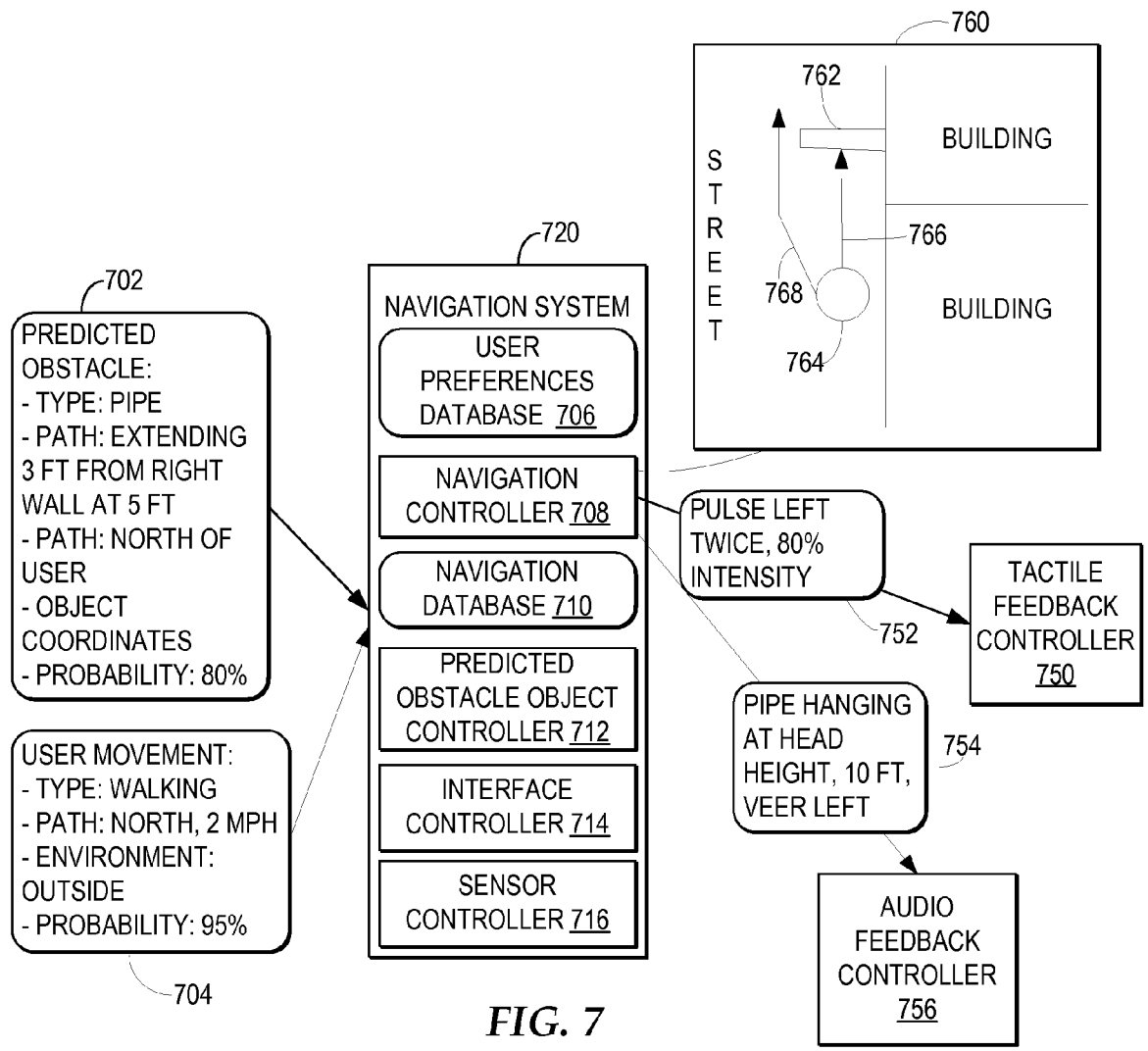
FIG. 7 is a block diagram illustrating one example of an object-enabled navigation system.

With reference now to FIG. 7, a block diagram illustrates one example of an object-enabled navigation system. In the example, a navigation system 720 facilitates navigation by a vision-impaired user. Navigation system 720 receives predicted obstacle records from object processing system 100, which enhances navigation system 720 to provide navigational output based on real-time, 3D images and other data captured for an actual environment in which a vision-impaired user attempts to navigate.

In particular, navigation controller 708 may base navigation instructions on a static model of a user environment which is updated based on predicted obstacle records received from object processing system 100 and other inputs received at navigation system 720. Navigation database 710 may include static data about an environment for supporting model building. For example, navigation database 710 may include or access structural maps, photographs, video streams, RFID information, and other data about an area in which a vision-impaired user is traveling. Navigation controller 708 may combine one or more types of data in navigation database 710 to build a model of the environment in which a vision-impaired user is traveling and to provide navigational outputs for guiding the vision-impaired user within the environment. Then, based on the predicted obstacle records and other inputs to navigation system 720, navigation controller 708 may update the model to include 3D mappings of objects within the environment and to include the user movement within the environment.

In the example, navigation system 720 received multiple types of predicted object records, including, but not limited to, predicted obstacle record 702 and predicted obstacle record 704. Navigation system 720, as an object-enabled application, includes a predicted obstacle object controller 712 to detect predicted obstacle record 702 and predicted obstacle record 704 and translate the object and user movement data within the records into inputs that facilitate navigation based modeling of a user environment by navigation controller 708.

In particular, in the example, a vision-impaired user is walking down a sidewalk and a low awning from a sidewalk cafe is within the focus area of the image capture devices worn by the vision-impaired user. Obstacle processing system 100 processes detected images and data within the focus area and outputs predicted obstacle record 702, which includes an indicator of the type of object, a "pipe", the path of the pipe, "extending 3 ft from right wall at 5 ft", the path of the pipe relative to the user, "north of user", the 3D object coordinates of the object, and the percentage probability that the object is accurately predicted of "80%". In addition, in the example, obstacle processing system 100 processes detected images and data and outputs predicted obstacle record 704, which includes an indicator of the type of user movement, "walking", the path of movement, "north at 2 mph (miles per hour)", the environment, "outside", and the percentage probability the user movement is accurately predicted of "95%". It is important to note that the examples of data included in predicted obstacle record 702 and predicted obstacle record 704 are illustrative of, but not limiting, of the types of data and the detail of data that may be included in obstacle records output by an obstacle processing system 100 and received by a navigation system 720. In addition, it is important to note that path information may include, but is not limited to, the measurements and position of a static object or the direction and pace of a moving object or user movement.

In one example, navigation controller 708 accesses structural maps of the area in which the vision-impaired user is traveling, where the structural maps mark streets, sidewalks, buildings, and other structures. Predicted obstacle object controller 712 translates predicted object record 702 and predicted object record 704 into information that navigation controller 712 then inserts within the structural map based model. For example, as illustrated in the mapping at reference numeral 760, based on the translation of predicted obstacle record 702 by predicted obstacle object controller 712 into a structural addition, navigation controller 708 inserts a structural addition 762, to a structural map of the area the vision-impaired user is traveling within, indicating the pipe described in predicted obstacle record 702. In addition, based on the translation of predicted obstacle record 704 by predicted obstacle object controller 712 into a structural addition, navigation controller 708 inserts a structural addition 764, to a structural map of the area the vision-impaired user is traveling within, indicating the detected path of the user. It is important to note that while the mapping depicted at reference numeral 760 depicts a top down view of an environment, the mapping includes the 3D characteristics of elements such as the pole indicated by structural additional 762. It is important to note that in inserting information translated from predicted obstacle records, navigation controller 708 may add a detected object, may update the 3D characteristics of an object already included in the mapping, or may delete an object from the mapping.

In addition to navigation system 720 receiving inputs from external systems, such as the predicted obstacle records received from object processing system 100, navigation system 720 may also receive inputs from the user, as facilitated by an interface controller 714. For example, interface controller 714 may prompt a user to provide information such as the user's intended destination, the user's intended time of departure from a particular location, the user's intended time of arrival at an intended designation, and other information that the vision-impaired user may provide to navigation controller 708 to facilitate navigation direction.

Further, navigation system 720 may receive inputs from a sensor controller 716, where the sensor controller may control one or more types of devices for sensing signals and data. In one example, sensor controller 716 may include a GPS controller for detecting a GPS position of a vision-impaired user. In another example, sensor controller 716 may include an RFID reader for detecting RFID signals. In particular, particular objects may be marked with RFID chips that include broadcastable information about the type of object, the location of the object, and the 3D shape of the object. In particular, in one embodiment predicted obstacle records may include or implement information detected from a GPS controller or an RFID reader, however, in another embodiment, as illustrated, navigation system 720 may include sensor controller 716 for separately sensing information about a user position and a user environment.

In building a model of a user environment, by accessing predicted obstacle records, vision-impaired user entered information, and other sensed information, navigation controller 708 may more accurately detect a user's actual 3D environment, predict the path of the user within the 3D environment, and predict a path that would aid the user in avoiding obstacles within the 3D environment. In one example, based on the speed of user movement detected in a predicted obstacle record, the user's indication of an intended destination, and the possible paths for a user to reach the destination, navigation controller 708 may predict the user's path and speed of travel and then predict whether obstacles detected within that path will be obstacles to the user. In another example, based on the GPS coordinates of a user's movement and the direction that the user is facing detected from a predicted obstacle record, navigation controller 708 may predict a direction of a user's path and predict whether obstacles detected within that path will be obstacles to the user.

By building a model of the user environment and predicting whether an object will be an obstacle to the user, navigation controller 708 may generate a recommended path or recommended instructions, to aid the user in navigating an obstacle. In the example, navigation controller predicts a path illustrated at reference numeral 766, based on current user movement and direction. Since the pole, illustrated at reference numeral 762, is along predicted path 766 and the vision-impaired user is taller than the height of the pole, navigation controller 708 generates a recommended path 768 for the user to avoid the pole.

Based on the navigation model build by navigation controller 708, navigation controller 708 may output different levels and types of information to a vision-impaired user to direct the vision-impaired user's path within an actual environment. In particular, a user preferences database 706 may indicate user preferences as to the types of objects to receive information about. Further, user preferences database 706 may specify navigation information output based on the type of environment in which a user is navigating, the type of user movement, the path of movement, or other factors set by the user.

In addition, navigation controller 708 may control one or more formats of outputs of navigational information. For example, navigation controller 708 may control output of tactile detectable outputs, audio outputs, and other formats of output that are detectable to a vision-impaired user. In addition, navigation controller 708 may control which format of output is used, if a user is able to receive multiple types of output formats, based on user preferences set within a user preference database 706.

In the example, if navigation controller 708 outputs tactile detectable feedback, in one example, navigation controller 708 may send a signal 752 to a tactile feedback controller 750 to pulse twice on a user's left side with 80% intensity, where each pulse directs the vision-impaired user to adjust a current path to the left by a particular amount and the intensity of the pulse indicates the urgency with which the user needs to adjust the user's path. In particular, as will be further illustrated with reference to FIG. 9, tactile feedback may be output with instructions for controlling a frequency, intensity, and. Further, as will be further described with reference to FIG. 8, navigation controller 708 may control output of tactile feedback that enables the user to virtually detect to feel a 3D rendering, through tactile feedback, of a potential obstacle.

In addition, in the example, if navigation controller 708 outputs audible feedback, in one example, navigation controller 708 may send an audio signal 754 to an audio feedback controller 756 to output the message "pipe handing at head height, 10 ft away, veer left." In another example, navigation controller 708 may send an audio signal to audio feedback controller that includes less information or that includes more specific directional information, such as, "take 5 steps forward", "take 1 step to the left" and "continue stepping forward."

Further, in addition to or as an alternative to output of speech-based audio feedback, navigation controller 708 may send an audio feedback signal of tones, similar to tactile feedback signals, but that when output via speakers provide the user with tone based directions to avoid objects. In particular, navigation controller 708 may control the strength and directional placement to tonal feedback to direct a user to avoid objects.

Figure 8:
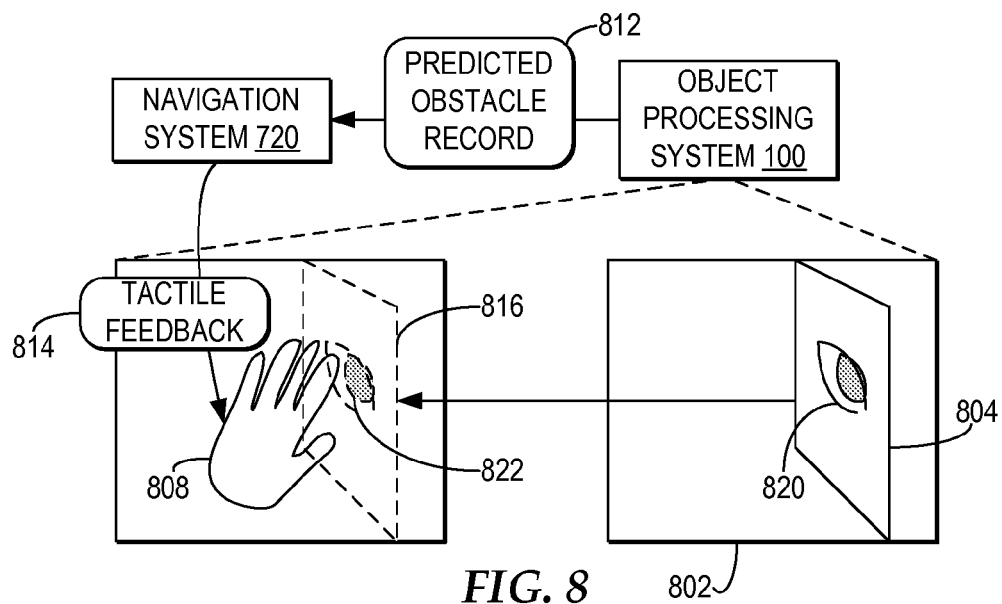
FIG. 8 is a block diagram depicting one example of a navigation controller enabling a user to detect a potential obstacle through tactile feedback.

Referring to FIG. 8, a block diagram illustrates one example of a navigation controller enabling a user detect a potential obstacle through tactile feedback. In the example, object processing system 100 detects objects within a focus area of an environment 802 and an environment 806. In the example, environment 802 includes at least one object, such as object 804, with a 3D surface. Object processing system 100 detects object 804 within proximate environment 802 and generates a 3D mapping of multiple points mapping the detectable boundaries and surface of object 804. Object processing system 100 creates at least one predicted obstacle record, such as predicted obstacle record 812, which includes the 3D mapping of object 804. Object processing system 100 passes predicted obstacle record 812 to navigation system 720.

In the example, navigation system 720 receives predicted obstacle record 812 and controls output, as tactile feedback 814, to enable the user to virtually detect to feel object 804 through tactile feedback through a tactile glove 808 covering the user's hand. In particular, object processing system 100 may detect the position of the user's hand within environment 806 and send predicted obstacle record 812, where predicted obstacle record 812 specifies a virtual 3D mapping of object 804 as if object 804 were actually in the position in front of the user's hand as illustrated at reference numeral 816. Object processing system 100 detects the user's hand move in association with the virtual object illustrated at reference numeral 816 and adjusts predicted obstacle record 812 to provide the virtual mapping of object 804 for output by navigation system 720 to tactile glove 808, such that the user may virtually detect a detected obstacle, as if the obstacle were right in front of the user, without the user having to actually approach the detected obstacle.

In particular, in the example, object 804 includes a lowered surface area 820. Therefore, the virtual object illustrated at reference numeral 816 also includes a virtual lowered surface area 822. As the user moves the user's hand in association with the virtual object illustrated at reference numeral 816, navigation system 720 receives predicted obstacle record 812 with indications of the change in 3D surface associated virtual lowered surface area 822 and may adjust the intensity of tactile feedback along points matching virtual bumped surface 822 to simulate the change in surface area the user would feel if actually touching lowered surface area 820.

In one embodiment, a user selects an object to virtually detect by pointing in a particular direction; object processing system 100 detects a hand pointing and provides navigation system 720 with predicted obstacle records for any detected objects within the area pointed to by the user. In another embodiment, a user selects an object to virtually detect by voice activation. Further, one or both of object processing system 100 and navigation system 720 may receive other types of inputs that select an object for a user to virtually detect. In addition, one or both of object processing system 100 and navigation system 820 may automatically select objects for a user to virtually detect based on an environment or user preferences.

Figure 9:
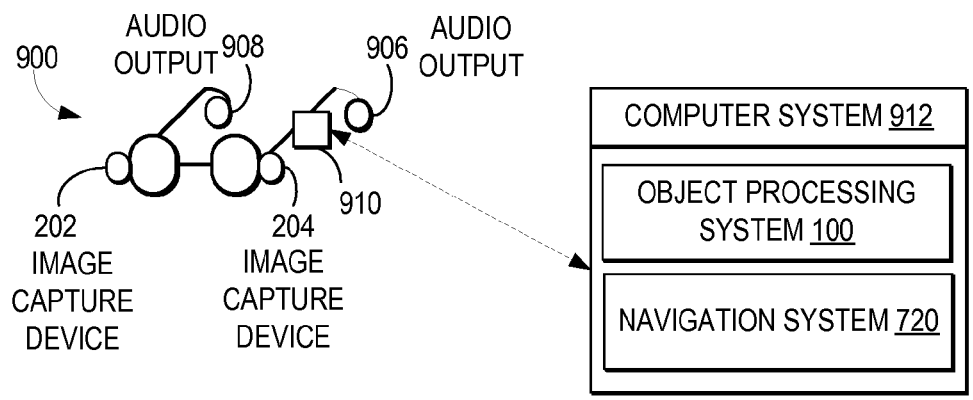
FIG. 9 is a block diagram illustrating one example of an object detection interface and a navigation output interface.

With reference now to FIG. 9, a block diagram illustrates one example of an object detection interface and a navigation output interface. In the example, FIG. 9 includes a headpiece 900, which is a wearable apparatus. A person, animal, or other movable entity may wear headpiece 900. In the example, headpiece 900 is a pair of glasses, however, in an additional or alternate embodiment, headpiece 900 may represent other types of wearable apparatus.

In the example, image capture device 202 and image capture device 204 are each affixed to headpiece 900. Each of image capture device 202 and image capture device 204 capture video image streams and other types of sensed data. Each of image capture devices 202 and image capture device 204 may transmit images and data to a computer system 912 implementing an object processing system 100 through a wired connection or through transmissions by a wireless transmitter 910 affixed to headpiece 900.

In one example, computer system 912 is a local, mobile computing system, such as computer system 500, carried or worn by the user wearing headpiece 900. For example, computer system 912 as a local, mobile computing system may be implemented in, for example, a hip belt attached computing system, a wireless telephony device, or a laptop computing system. In another example, computer system 912 remains in a fixed position, but receives wireless transmissions from wireless transmitter 910 or other wireless transmitters within the broadcast reception range of a receiver associated with computer system 912.

Object processing system 100 may run within computer system 912 or may interface with other computing systems providing object processing services to process captured images and data and return a predicted gesture from the captured images and data. In particular, computer system 912 may include a wired or wireless network interface through which computer system 912 interfaces with other computing systems via network 502.

In one example, image capture device 202 and image capture device 204 are positioned on headpiece 900 to capture a focus area from directly in front of the user to a distance extended in front of the user, such as several yards in front of the user. By the focus area including the area directly in front of the user, image capture device 202 and image capture device 204 may capture images of the user's hand and may also capture images of objects quickly moving into a user's path. In addition, by the focus area including the area extending in front of the user, image capture device 202 and image capture device 204 may capture images of objects that are potentially obstacles to the user's path. Further, image capture device 202 and image capture device 204 may be positioned on headpiece 900 to capture areas to the side, above, and behind a user, dependent upon an environment in which a vision-impaired user is within. Object processing system 100 processes the images and data captured by image capture device 202 and image capture device 204, and, based on learning the types of objects and types of movement most helpful to the vision-impaired user, passes predicted obstacle records to navigation system 720 for output to the vision-impaired user.

In navigation system 720 controlling outputs to the vision-impaired user, in the example, navigation system 720 may send audio feedback to headpiece 900, where headpiece 900 includes an audio output device 906 and an audio output device 908 are affixed to headpiece 900 and positioned as earpieces for output of audio in a user's ears. Each of audio output device 906 and audio output device 908 may receive audio transmission for output from computer system 912 via a wired connection or from wireless transmitter 910, as directed by navigation system 720.

In one example, image capture device 902 and image capture device 904 capture the image of a person approaching the vision-impaired user and object processing system 100 receives the captured images and predicts an object of an approaching person, including characteristics such as the height, size, and pace of the approaching person. Object processing system 100 passes the characteristics of the approaching person in a predicted obstacle record to navigation system 720. Navigation system 720 translates the predicted obstacle record into audio output of "6 ft tall person approaching from the left at 3 mph" and navigation system 720 controls output of the translated audio into audio output device 906 and audio output device 908. In another example, navigation system 720 translates the predicted obstacle record into audio tones that indicate the position of and distance to the approaching person and navigation system 720 controls output of the translated audio tones into audio output device 906 and audio output device 908. In addition to identifying an image of a person, because object processing system 100 processes a 3D image of a person, object processing system 100 may be trained to identify particular people or animals, based on voice recognition or image recognition, for example, who a vision-impaired user comes in contact with regularly.

It is important to note that while in the example, image capture device 202, image capture device 204, audio output device 906, and audio output device 908 are affixed to a same headpiece 900, in alternate embodiments, the image capture devices may be affixed to a separate headpiece from the audio output devices. In addition, it is important to note that while in the example, computer system 912 includes both object processing system 100 and navigation system 720, in an alternate embodiment, different computing systems may implement each of object processing system 100 and navigation system 720.

In addition, it is important to note that multiple people may each wear a separate headpiece, where the images captured by the image capture devices on each headpiece are transmitted to a same computer system, such as computer system 912, via a wireless or wired network connection. By gathering collaborative images and data from multiple people, object processing system 100 may more accurately detect objects representative of gestures and predict a gesture from detected moving objects.

Further, it is important to note that multiple local mobile computer systems, each gathering images and data from image capture devices and sensors affixed to a headpiece may communicate with one another via a wireless or wired network connection and share gathered images, data, detected objects, and predicted paths of detected objects. In one example a group of users within a local wireless network broadcast area may agree to communicatively connect to one another's portable computer devices and share images and data between the devices, such that an object processing system accessible to each device may more accurately predict objects which will be obstacles from the collaborative images and data.

In either example, where collaborative images and data are gathered at a single system or shared among multiple systems, additional information may be added to or extracted from the images and data to facilitate the placement of different sets of captured images and data relative to other sets of captured images and data. For example, images and data transmitted for collaboration may include location indicators and orientation indicators, such that each set of images and data can be aligned and orientated to the other sets of images and data.

Figure 10:
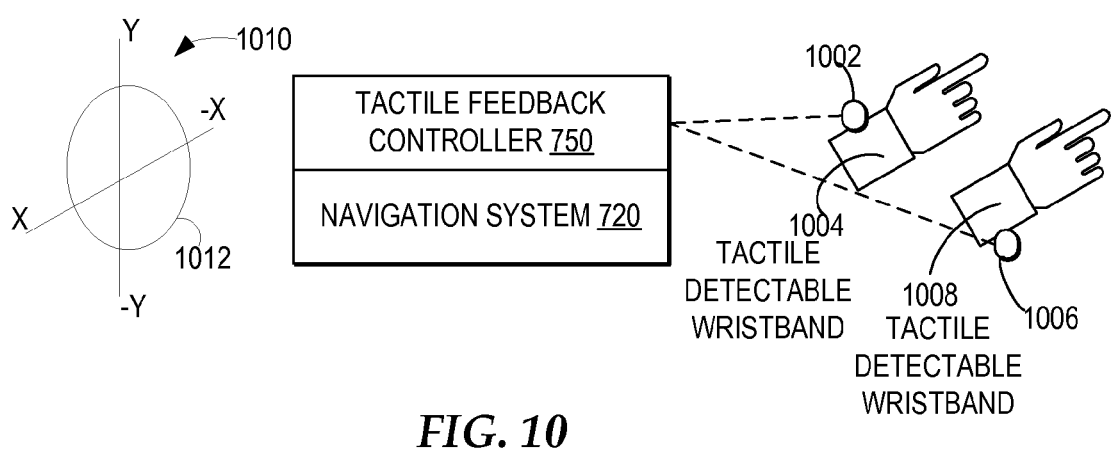
FIG. 10 is an illustrative diagram depicting one example of tactile detectable feedback devices receiving tactile feedback from a navigation system.

Referring now to FIG. 10, an illustrative diagram illustrates one example of tactile detectable feedback devices receiving tactile feedback from a navigation system. As illustrated, a person may wear wristbands 1004 and 1008, which each include controllers for controlling tactile detectable outputs and hardware which can be controlled to create the tactile detectable outputs. Examples of tactile detectable outputs may include detectable pulsing, detectable changes in the surface of the wristbands, and other adjustments that can be sensed by the user wearing wristbands 1004 and 1008. In addition, tactile detectable outputs may be adjusted in frequency, intensity, duration, and other characteristics that can be sensed by the user wearing wristbands 1004 and 1008.

In the example, wristband 1004 includes a wireless transmitter 1002 and wristband 1008 includes a wireless transmitter 1006. Each of wireless transmitter 1002 and wireless transmitter 1006 communicate via a wireless network transmission to tactile feedback controller 750. Tactile feedback controller 750 receives tactile signals from navigation system 720 and transmits signals to each of wireless transmitters 1002 and 1006 to direct tactile output from wristbands 1004 and 1008. Navigation system 720 detects predicted obstacle records from an object processing system, incorporates the predicted obstacle records into a navigational mapping of a vision-impaired user's environment, and translates the navigational mapping into tactile outputs for providing the vision-impaired user with directions, warnings, and other navigational information. In particular, in translating predicted obstacle records into tactile feedback output, navigation system 720 may translate directions, warnings and other navigational information into feedback at one or both of wristbands 1004 and 1008, using one or more intensity levels, positions of feedback, and patterns of feedback. In particular, a person can quickly learn that a pulse on the right wrist means "step to the right" and a pulse on the left wrist means "step to the left", however, a person may not be able to remember a different tactile feedback output for every possible type of gesture. Thus, a user may limit, via navigation system 720, the types of predicted gestures output via tactile feedback to a limited number of types of warnings or navigation signals based on the types of tactile feedback output that can be remembered by the user.

In particular, navigation system 720 transmits tactile signals to each of wristbands 1004 and 1008 for controlling the pulse patterns, positions, force, duration, frequency, and timing of outputs around the circumference of each wristband. In an example illustrated at reference numeral 1010, navigation system 720 sends tactile signals for controlling a band 1012 where each tactile signal includes an x and a y coordinate and force. Thus, navigation system 720 may direct a tactile signal to cause a pulse at a y position to direct a user to raise the position of the user's arm and to cause a pulse at a –y position to direct a user to lower the position of the user's arm. The pattern and positions of pulses may vary in width, such as from the y position to the x position, and direction, such as a rotating pulse clockwise around a wristband.

Additionally, each of wireless transmitters 1002 and 1006 may include sensors to monitor the relative position of each of wristbands 1004 and 1008 compared with the force of gravity. Referring to the example illustrated at reference numeral 1010, as a user wearing band 1012 rotates the user's arm, the y position for controlling tactile outputs would always remain up and the –y position down, relative to the force of gravity, such that the tactile signals are re-positioned about the depicted axis based on the current position the user's arm.

In one example, navigation system 720 directs a vision-impaired user to shake another person's hand through tactile signals that indicate the proximity of the other hand as well as tactile signals that direct the vision-impaired user to raise, lower or rotate the vision-impaired user's hand. In addition, navigation system 720, or the object processing system providing inputs to navigation system 720, may share information with other object processing systems and navigation systems. By sharing information, each navigation system receives indicators of the directions provided to other vision-impaired users. In addition, by sharing information, for two vision-impaired users to shake hands, the navigation systems for the users may communicate and decide that the first vision-impaired user should be directed to maintain the position of that user's hand and the second vision-impaired user should be directed to move to coordinate the shaking of hands.

In the example, tactile feedback controller 750 and navigation system 720 are enabled on a computer system 1020. In addition, tactile feedback controller 1000 and navigation system 720 may be distributed across multiple computer systems communicative via a network connection.

It is also important to note that, for a user whose vision is impaired in some way or a user without a direct line of sight to a speaker, providing tactile feedback outputs indicative of the gestures made around the user or by others communicating with the user, requires translating stationary and moving objects and other obstacles or indicators of potential obstacles into a non-verbal communication detectable by the user. It is important to note, however, that wristbands 1004 and 1008 are examples of one type of tactile feedback devices located in two fixed positions; in alternate embodiments, other types of tactile feedback devices may be implemented, one or more tactile devices may be implemented, and tactile devices may be detectable in one or more locations. For example, many telephony devices already include a vibration feature that navigation system 720 may control by sending signals to control vibrations representative of predicted gestures. In another example, a user may wear a tactile detectable glove, as described with reference to FIG. 8, which functions as a Braille device or 3D touch sensitive device with tactile adjustable interfaces in the fingertips of the glove.

It is important to note that a user may wear both headpiece 900 and tactile detectable wristbands 1004 and 1008. In this example, navigation application 720 would control output to either or both of tactile feedback controller 1000 and wireless transmitter 910. Further, headpiece 900 may include a microphone (not depicted) that detects when the audio around a user and navigation controller 720 may select to output audio feedback when the noise is below a particular level and to output a tactile detectable output when the noise is above a particular level.

Referring now to FIG. 11, a high level logic flowchart depicts a process and program for an object processing system to predict object types and paths with a percentage certainty and to detect and predict user movement and paths. In the example, the process starts at block 1100, and thereafter proceeds to block 1102. Block 1102 depicts capturing, via a stereoscopic image capturing device, multiple image streams and via sensors, sensor data, within a focus area. Next, block 1104 illustrates tracking objects within the images and sensor data. Thereafter, block 1106 depicts generating a stream of 3D object properties for tracked objects and a stream of 3D user movement properties for tracked user movement. Thereafter, block 1108 depicts aggregating the 3D object properties for each of the tracked objects and the 3D user movement properties. Next, block 1110 illustrates predicting at least one type of object and the path of the object from the aggregated stream of 3D object properties from one or more object definitions that match the aggregated stream of 3D object properties with a percentage of certainty. In addition, next, block 1112 depicts predicting a type of user movement and path from the aggregated stream of 3D user movement properties from any user movement definitions matching the data available in the user movement properties. In particular, in predicting the type of object and object path and type of user movement and path, the object processing system may also predict whether the object will intersect the user's path. Thereafter, block 1114 depicts transmitting each predicted type of object and user movement in predicted obstacle records to an object-enabled application, such as a navigation system, and the process ends.

With reference now to FIG. 12, a high level logic flowchart depicts a process and program for gesture detection by tracking objects within image streams and other sensed data and generating 3D object properties for the tracked objects. As illustrated, the process starts at block 1200 and thereafter proceeds to block 1202. Block 1202 depicts a gesture detector system receiving multiple video image streams, via stereoscopic image capture devices, and sensed data, via one or more sensors. Next, block 1204 illustrates the gesture detector system attaching metadata to the video image frames and sensed data, and the process passes to block 1206. In one example, metadata includes data such as, but not limited to, a camera identifier, frame number, timestamp, and pixel count.

Block 1206 depicts the gesture detector system processing each video image stream and sensed data to detect and track objects. Next, block 1208 illustrates generating streams of tracked object properties with metadata from each video stream. Thereafter, block 1210 depicts combining the tracked object properties to generate 3D object properties and user movement properties with metadata. Next, block 1212 illustrates transmitting the 3D tracked object properties and user movement properties to an object interpreter system, and the process ends.

Figure 13:
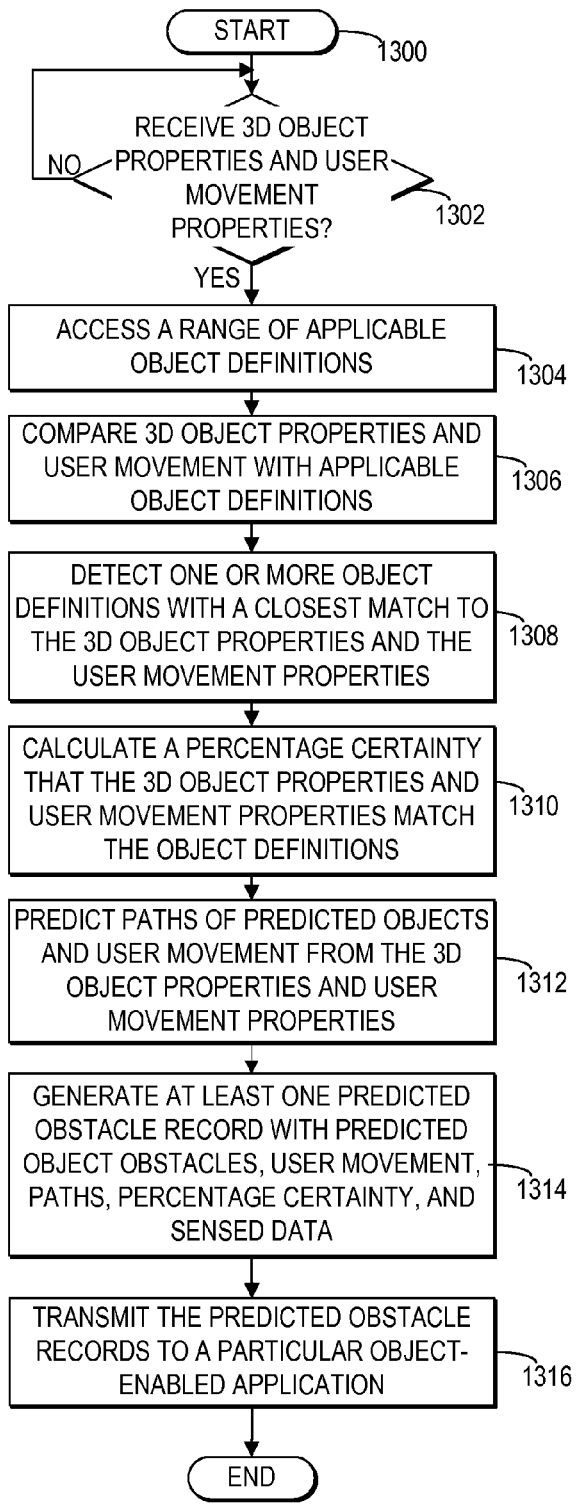
FIG. 13 is a high level logic flowchart illustrating a process and program for object and user movement prediction from tracked 3D object properties and user movement properties.

Referring now to FIG. 13, a high level logic flowchart depicts a process and program for object and user movement prediction from tracked 3D object properties and user movement properties. In the example, the process starts at block 1300 and thereafter proceeds to block 1302. Block 1302 depicts a determination whether the object interpreter system receives 3D object properties and user movement properties. When the object interpreter system receives 3D object properties and user movement properties, then the process passes to block 1304. Block 1304 depicts accessing a range of applicable object definitions, and the process passes to block 1306. Applicable object definitions may vary based on the object-enabled application to which a predicted obstacle record will be transmitted.

Block 1306 illustrates the object interpreter system comparing the 3D object properties for tracked objects and user movement properties with the applicable object definitions. Next, block 1308 depicts the object interpreter system detecting at least one object definition with a closest match to the 3D object properties and user movement properties. Thereafter, block 1310 illustrates calculating a percentage certainty that the 3D object properties and user movement properties match the object definitions. Next, block 1312 depicts predicting paths of detected objects and user movement from the 3D object properties and user movement properties. Thereafter, block 1314 illustrates generating at least one predicted obstacle record with any predicted objects, object paths, user movement, user movement paths, percentage certainties, and sensed data. Next, block 1316 depicts transmitting the predicted obstacle records to a particular object-enabled application, and the process ends.

Figure 14:
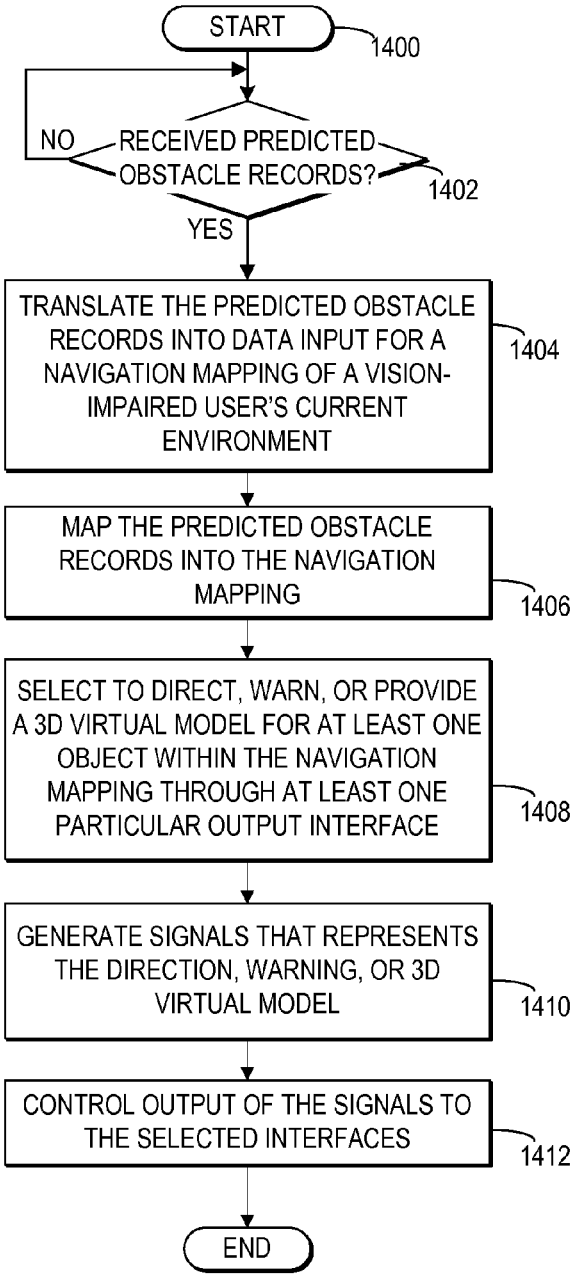
FIG. 14 is a high level logic flowchart depicting a process and program for applying a predicted obstacle record in an object-enabled navigation system.

With reference now to FIG. 14, a high level logic flowchart depicts a process and program for applying a predicted obstacle record in an object-enabled navigation system. As illustrated, the process starts at block 1400 and thereafter proceeds to block 1402. Block 1402 depicts a determination whether an object-enabled navigation system receives a predicted obstacle record. When the navigation system receives a predicted obstacle record, then the process passes to block 1404. Block 1404 depicts the navigation system translating the predicted obstacle records into data input for a navigation mapping of a vision-impaired user's current environment. Next, block 1406 illustrates mapping the predicted obstacle records into the navigation mapping. Thereafter, block 1408 depicts selecting to direct, warn, or provide tactile detectable 3D virtual model for at least one object within the navigational mapping through at least one particular output interface. Next, block 1410 illustrates generating signals that represent the direction, warning, or 3D virtual mode. Thereafter, block 1412 depicts controlling output of the signals to the selected interfaces, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for assisting a user with information about an environment relative to the user, comprising:
    capturing a three-dimensional movement of a moving object within the environment, wherein the three-dimensional movement is determined using at least one image capture device aimed at the moving object;
    predicting a physical movement mobile path of the user based on a detected direction and pace of the physical movement of the user;
    determining whether the movement of the moving object will intersect with the mobile path of the user; and
    informing the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

2. The computer-implemented method according to claim 1, further comprising:
    capturing a three-dimensional location of a stationary object within the environment, wherein the three-dimensional location is determined using at least one image capture device aimed at the stationary object;
    determining whether the three-dimensional location of the stationary object will intersect with the mobile path of the user; and
    informing the user whether the stationary object will intersect the mobile path of the user.

3. The computer-implemented method according to claim 1, further comprising:
    identifying a three-dimensional object properties stream using the captured three-dimensional movement of the moving object;
    identifying a particular type of object representing the three-dimensional object properties stream by comparing the identified three-dimensional object properties steam with a plurality of object definitions for the environment by mapping the three-dimensional movement of the moving object to a particular gesture object definition from among a plurality of gesture object definitions, wherein the particular gesture object definition identifies a particular gesture by another user, wherein the three-dimensional movement of the moving object is the particular gesture by another user; and in response to identifying the particular type of object comprising the particular gesture from among the plurality of object definitions, informing the user of the particular gesture detected within the environment.

4. The computer-implemented method according to claim 1, wherein informing the user whether the movement of the moving object will intersect the mobile path of the user further comprises:

capturing the three-dimensional movement of the moving object comprising a movement of another user's hand toward the user; and informing the user of the movement required of the user's hand to intersect with the another user's hand to shake the another user's hand by adjusting outputs to a tactile glove covering the user's hand to direct the user's hand to intersect with the another user's hand.

5. The method of claim 1, further comprising:

determining a percentage probability that the physical movement mobile path is accurately predicted; and adjusting an output informing the user whether the movement of the moving object will intersect the mobile path of the user to indicate the percentage probability, wherein the output is tactile detectable feedback to at least one tactile device worn by the user, wherein the intensity of feedback output via the at least one tactile device is adjustable.

6. The method of claim 1, further comprising:

predicting that the moving object is a particular type of object from the captured three-dimensional movement from a particular object definition;

prompting the user to indicate whether the predicted particular type of object is correct; and responsive to the user indicating the predicted particular type of object is correct, updating the object definition with at least one object property of the captured three-dimensional movement.

7. The method of claim 1, further comprising:

predicting that the physical movement mobile path of the user is a particular type of movement from a particular movement definition;

prompting the user to indicate whether the predicted particular type of movement matches the user's actual mobile path; and responsive to the user indicating the predicted particular type of movement matches the user's actual mobile path, updating the movement definition with at least one object property of the predicted physical movement mobile path of the user.

8. A system for assisting a user with information about an environment relative to the user, comprising:

an object processing system, comprising at least one processor, operative to capture a three-dimensional movement of a moving object within the environment, wherein the three-dimensional movement is determined using at least one image capture device aimed at the moving object, predicting a physical movement mobile path of the user based on a detected direction and pace of the physical movement of the user, and determining whether the movement of the moving object will intersect with the mobile path of the user; and a navigation system, comprising at least one additional processor, operative to receive from the object processing system the determination whether the movement of the moving object will intersect with the mobile path of the user and control outputs for informing the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

9. The system according to claim 8, further comprising:

said object processing system operative to capture a three-dimensional location of a stationary object within the environment, wherein the three-dimensional location is determined using at least one image capture device aimed at the stationary object; and said object processing system operative to determine whether the three-dimensional location of the stationary object will intersect with the mobile path of the user; and said navigation system operative to inform the user whether the stationary object will intersect the mobile path of the user.

10. The system according to claim 8, further comprising:

said object processing system operative to identify a three-dimensional object properties stream using the captured three-dimensional movement of the moving object; and said object processing system operative to identify a particular type of object representing the three-dimensional object properties stream by comparing the identified three-dimensional object properties steam with a plurality of object definitions for the environment by mapping the three-dimensional movement of the moving object to a particular gesture object definition from among a plurality of gesture object definitions, wherein the particular gesture object definition identifies a particular gesture by another user, wherein the three-dimensional movement of the moving object is the particular gesture by another user; and said navigation system operative, in response to receiving an identifier from said object processing system of the particular type of object comprising the particular gesture from among the plurality of object definitions, for informing the user of the particular gesture detected within the environment.

11. The system according to claim 8, further comprising:

said object processing system operative to capture the three-dimensional movement of the moving object comprising a movement of another user's hand toward the user; and said navigation system operative to inform the user of the movement required of the user's hand to intersect with the another user's hand to shake the another user's hand by adjusting outputs to a tactile glove covering the user's hand to direct the user's hand to intersect with the another user's hand.

12. A computer program product for assisting a user with information about an environment relative to the user, the computer program product comprising:

one or more computer-readable tangible storage devices;

program instructions, stored on at least one of the one or more storage devices, to capture a three-dimensional movement of a moving object within the environment, wherein the three-dimensional movement is determined using at least one image capture device aimed at the moving object;

program instructions, stored on at least one of the one or more storage devices, to predict a physical movement mobile path of the user based on a detected direction and pace of the physical movement of the user;

program instructions, stored on at least one of the one or more storage devices, to determine whether the movement of the moving object will intersect with the mobile path of the user; and program instructions, stored on at least one of the one or more storage devices, to inform the user whether the movement of the moving object will intersect the mobile path of the user by adjusting an intensity of a tactile feedback along at least one point of a tactile glove worn by the user to simulate the change in surface area the user would feel if actually intersecting with the moving object, without the user having to actually approach the detected moving object.

* * * * *